(12) United States Patent
Nishimura et al.

(10) Patent No.: US 10,549,711 B2
(45) Date of Patent: Feb. 4, 2020

(54) AIRBAG-USE WOVEN FABRIC AND AIRBAG

(71) Applicant: Toyobo Co., Ltd., Osaka (JP)

(72) Inventors: Hirokazu Nishimura, Tsuruga (JP); Yusuke Kojyo, Iwakuni (JP); Ryuji Kamimura, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 85 days.

(21) Appl. No.: 15/564,029

(22) PCT Filed: Apr. 1, 2016

(86) PCT No.: PCT/JP2016/060977
§ 371 (c)(1),
(2) Date: Oct. 3, 2017

(87) PCT Pub. No.: WO2016/159378
PCT Pub. Date: Oct. 6, 2016

(65) Prior Publication Data
US 2018/0086301 A1  Mar. 29, 2018

(30) Foreign Application Priority Data

Apr. 3, 2015  (JP) ................. 2015-076561
Jun. 11, 2015  (JP) ................. 2015-118278
Mar. 16, 2016  (JP) ................. 2016-052275

(51) Int. Cl.
*B60R 21/235* (2006.01)
*D03D 1/02* (2006.01)
*D03D 15/00* (2006.01)

(52) U.S. Cl.
CPC ............ *B60R 21/235* (2013.01); *D03D 1/02* (2013.01); *D03D 15/00* (2013.01);
(Continued)

(58) Field of Classification Search
CPC ....... B60R 21/235; B60R 21/02; B60R 21/06; B60R 21/23; B60R 21/23509
See application file for complete search history.

(56) References Cited

U.S. PATENT DOCUMENTS

2009/0136750 A1  5/2009 Shen et al.
2011/0302689 A1  12/2011 Tone et al.
(Continued)

FOREIGN PATENT DOCUMENTS

CN  1603174 A  4/2005
CN  102317518 A  1/2012
(Continued)

OTHER PUBLICATIONS

Japanese Patent Office, International Search Report for PCT /JP2016/060977 dated Jul. 12, 2016 (with English translation).
(Continued)

*Primary Examiner* — Arti Singh-Pandey
(74) *Attorney, Agent, or Firm* — Fish & Richardson P.C.

(57) ABSTRACT

The purpose of the present invention is to provide an airbag-use non-coated woven fabric that achieves light in weight, compact in size, and low air permeability, and an airbag-use woven fabric having low air permeability, being flexible, and exhibiting good package ability without impairing mechanical strength of the woven fabric, and an airbag that uses the airbag-use woven fabric. The airbag-use woven fabric including a base fabric, wherein a yarn widening ratio of unwoven weaving yarn of fibers that constitute the base fabric is not less than 2.4 and not more than 3.5, or including single yarn fibers having a substantially triangular cross sectional shape and a modification degree of 1.3 to 2.2; having a tear strength of not less than 120 N; and having an air permeability under a pressure difference of 20 kPa of not more than 0.65 L/cm²/min.

17 Claims, 5 Drawing Sheets

(52) U.S. Cl.
CPC ............... *B60R 2021/23509* (2013.01); *B60R 2021/23542* (2013.01); *D10B 2331/02* (2013.01); *D10B 2505/124* (2013.01)

(56) References Cited

U.S. PATENT DOCUMENTS

| | | |
|---|---|---|
| 2012/0225229 A1 | 9/2012 | Ise |
| 2014/0106098 A1 | 4/2014 | Ise |

FOREIGN PATENT DOCUMENTS

| | | |
|---|---|---|
| CN | 102471954 A | 5/2012 |
| EP | 2065492 | 6/2009 |
| JP | H08-199449 | 8/1996 |
| JP | H09-209223 | 8/1997 |
| JP | 3144307 | 3/2001 |
| JP | 2003-055861 | 2/2003 |
| JP | 2003-293243 | 10/2003 |
| JP | 2004-176221 | 6/2004 |
| JP | 3859135 | 12/2006 |
| JP | 4685904 | 5/2011 |
| KR | 10-2005-0041351 A | 5/2005 |
| KR | 1 00540041 | 12/2005 |
| TW | 200923148 | 6/2009 |
| WO | 2011/055562 | 5/2011 |

OTHER PUBLICATIONS

European Patent Office; Extended European Search Report mailed in corresponding European Application No. 16773258.5 (dated Nov. 20, 2018).

China National Intellectual Property Administration; Office Action mailed in counterpart Chinese Application No. 201680019453.6 (dated Apr. 28, 2019) with English-language translation.

[Fig.1]
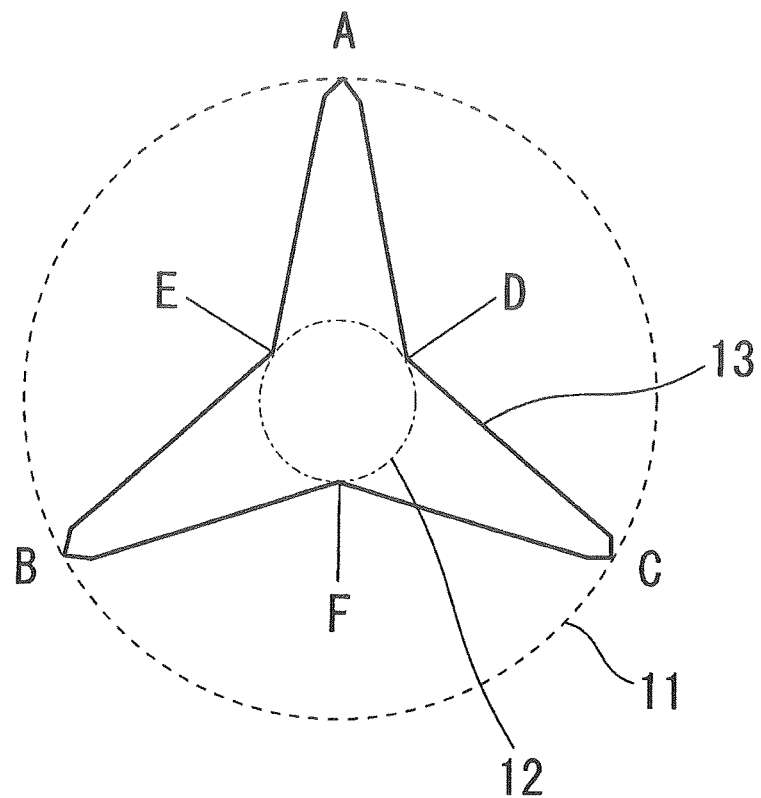
[Fig.2]
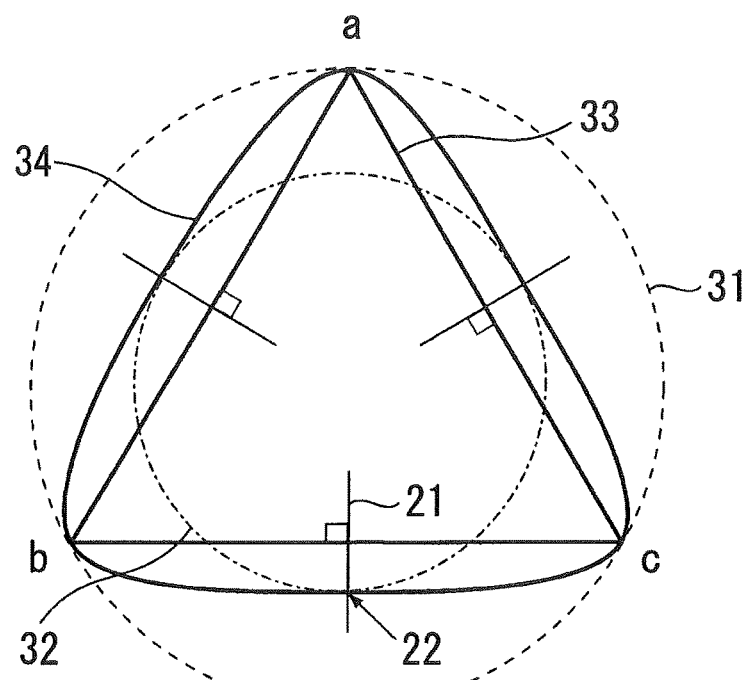

[Fig.3]
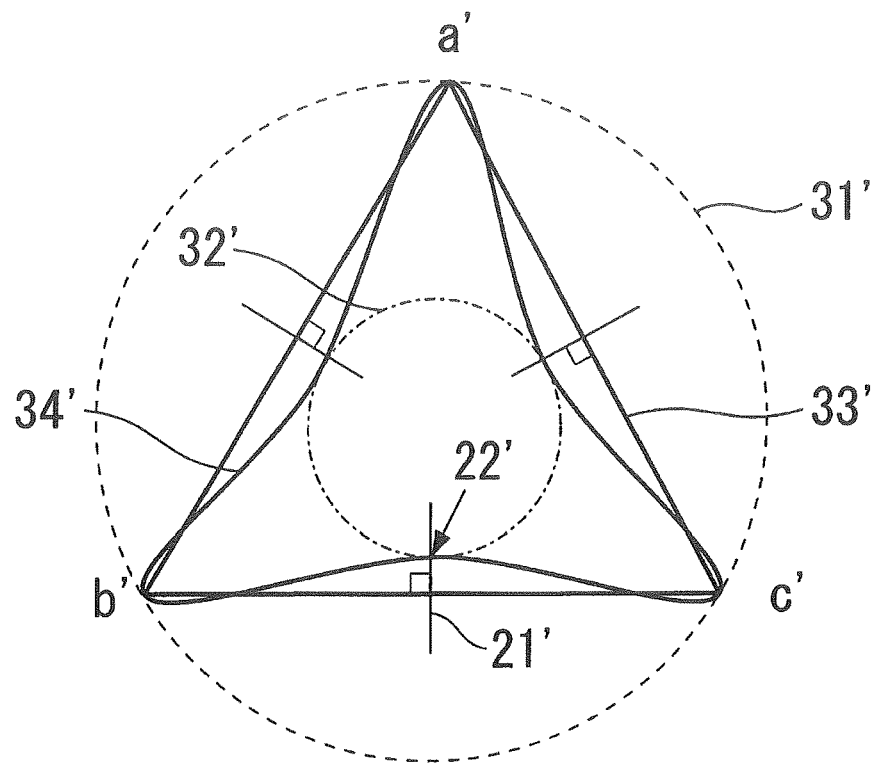
[Fig.4]
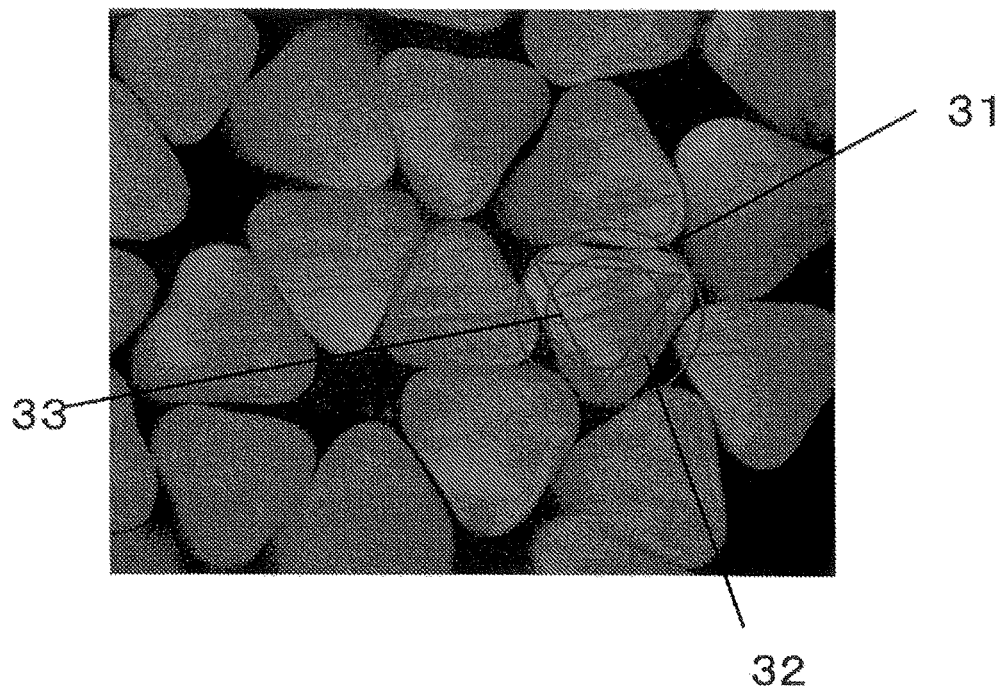

[Fig.5]
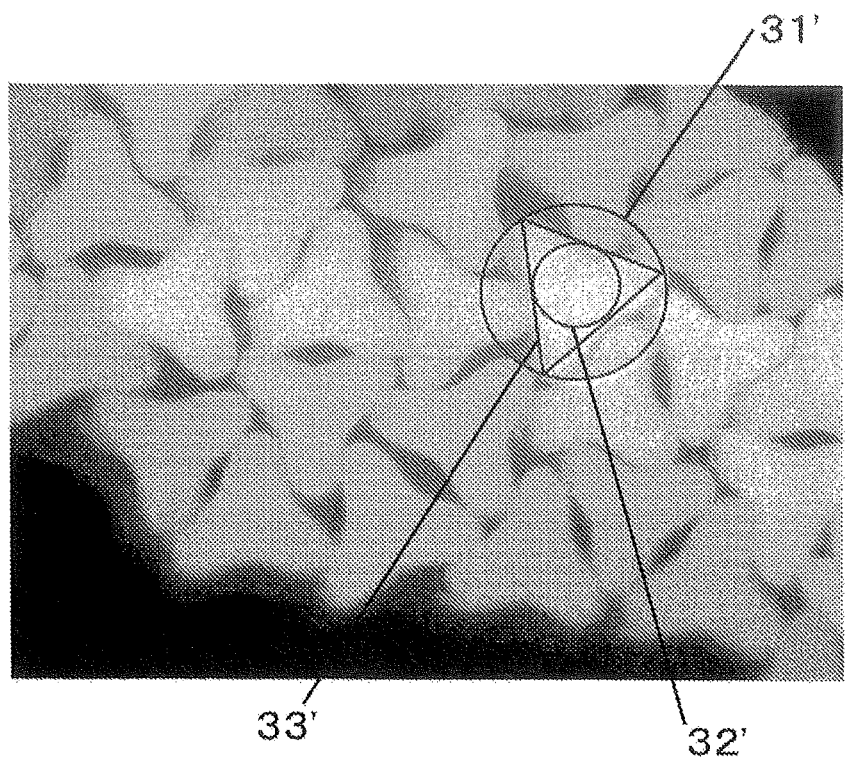
[Fig.6]
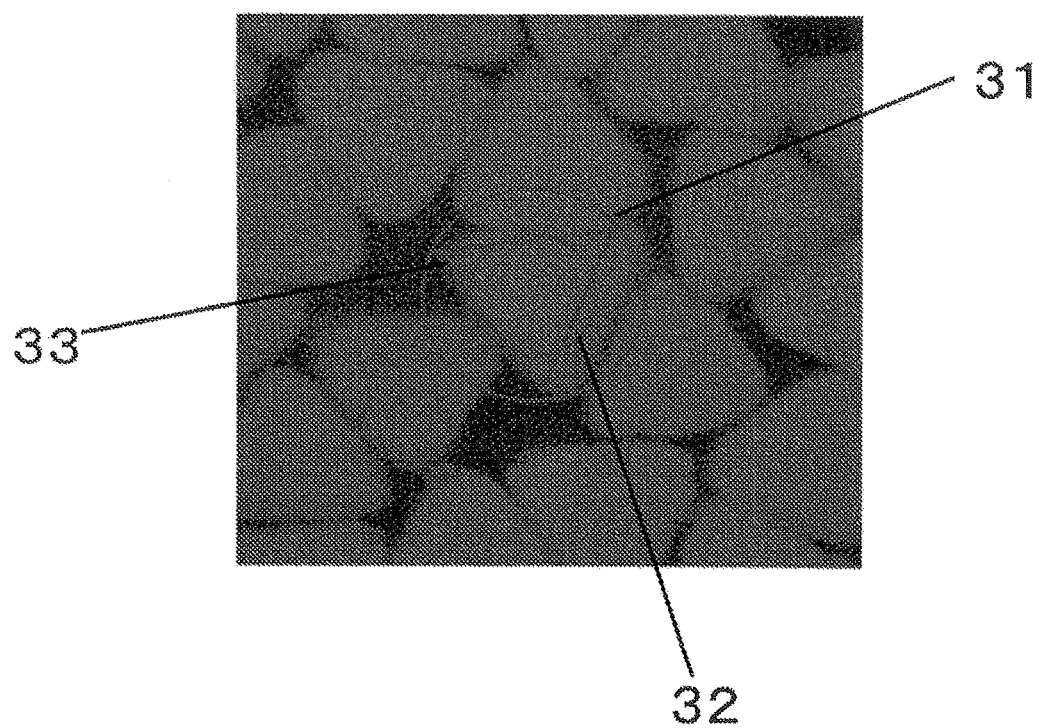

[Fig.7]
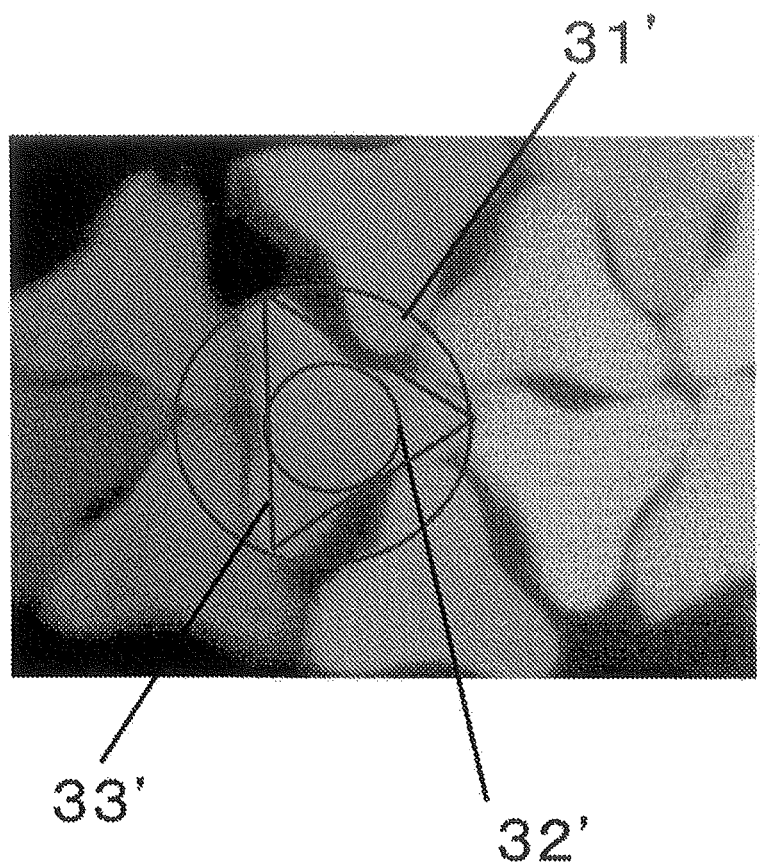

[Fig.8]
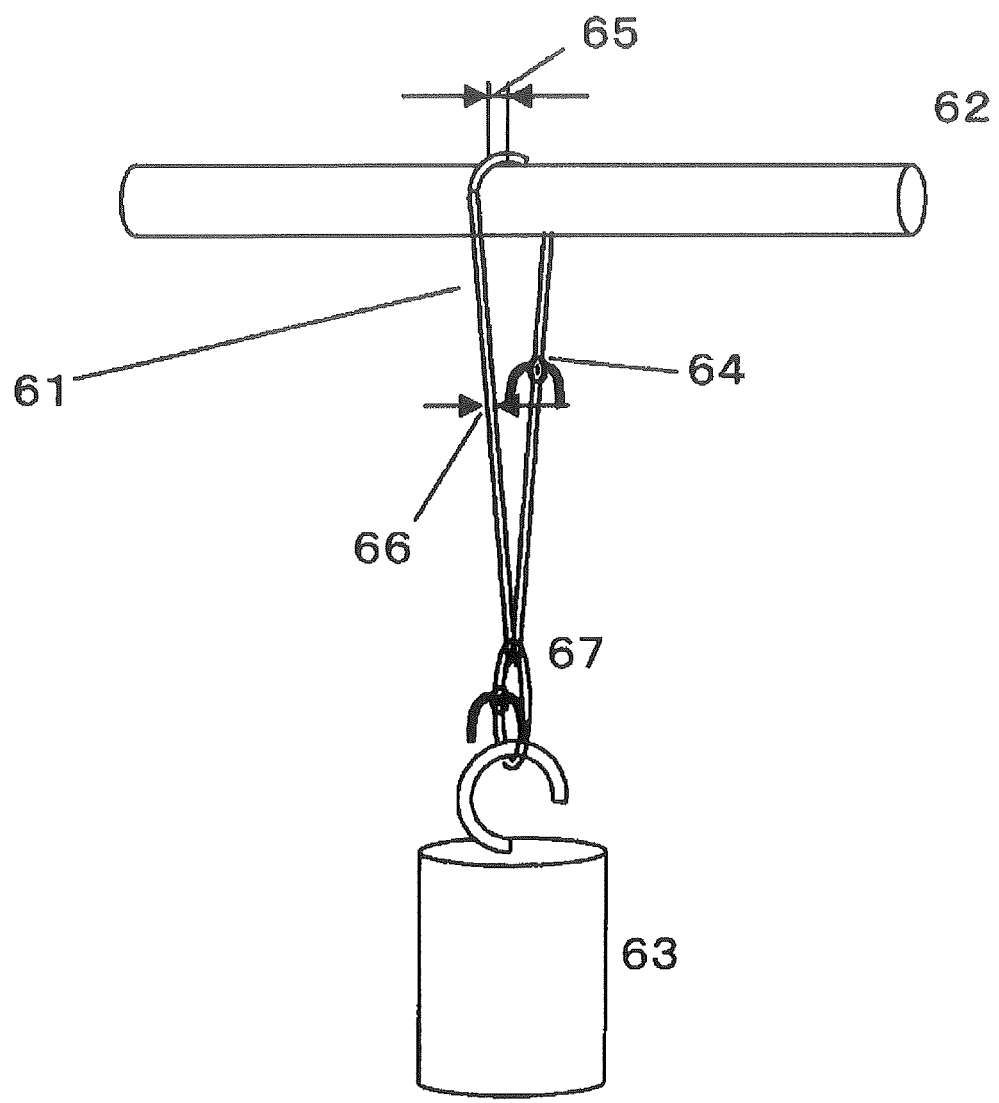

AIRBAG-USE WOVEN FABRIC AND AIRBAG

TECHNICAL FIELD

The present invention relates to an airbag-use woven fabric and an airbag.

BACKGROUND ART

In recent years, an airbag of which installation rate has been rapidly increased as one of automobile safety parts, prevents or protects the driver or fellow passenger in the following manner. Upon an automobile collision accident, a sensor senses impact, an inflator generates a gas at a high temperature and a high pressure, this gas rapidly develops an airbag, thereby, a body of the driver or fellow passenger, particularly a head, is prevented or protected from colliding against a handle, a front glass, a door glass, or the like.

Currently, not only a driver-side airbag or a passenger-side airbag against frontal collision of an automobile, a knee airbag for knee protection, a side airbag or a side curtain airbag against side collision, and an airbag against rear collision are being adopted. Further, in recent years, an airbag for protecting a pedestrian against collision has been known and the airbag installation portion continues to grow.

As the airbag installation rate is increasing, a lighter and more compact airbag module is a very important technique in order to secure fuel economy performance of and indoor space in an automobile. Among individual parts in such module, the airbag accounts for a significant ratio in terms of both volume and weight, so that a lighter and more compact airbag is always required.

To meet such requirement, in recent years, there has been an increasing demand for a lighter and more compact uncoated fabric to which a resin coating is not applied.

In order to make such uncoated fabric further lighter and more compact, the reduction in the amount of yarn used for a woven fabric has been studied by lowering the fineness of fibers that constitute the woven fabric, by reducing the number of stitches, or the like. This reduction, however, deteriorates the air permeability (increases the air permeability), so that the size of the inflator needs to be increased, resulting in increased volume and weight of the airbag module.

As a method for solving this problem, the following method has been known: The air permeability of the base fabric is lowered by setting the single yarn fineness that constitutes fibers smaller (Patent Document 1).

Other than the reduction of the single yarn fineness, there has been also known a method of forming the cross section of the single yarn into a flat shape to lower the air permeability (Patent Document 2). Patent Document 2 discloses that in the woven fabric using flat cross-section yarns, the longer diameters of the single yarn cross section are arranged in stack, so that the gap per unit cross section in the cross section of the woven fabric reduces, thereby achieving low air permeability.

Recently miniaturization of automobiles has been increased, and among development needs such as secured indoor space, visibility of various meters from the driver's seat, or reduction in weight of a vehicle body due to improvement of fuel efficiency during running of automobiles, in particular, a demand for a lighter and more compact airbag is growing rapidly.

An airbag used in an airbag system requires that a bag-like article that is obtained by cutting an airbag-use woven fabric into a specific shape and sewing the cut woven fabric, can be accommodated in a space as small as possible. In order to be accommodated in such a small space, a woven fabric which has low rigidity and is easily foldable is used.

As a general method for obtaining a woven fabric having low rigidity, a method of reducing the fineness of fibers that constitute a woven fabric, or a method of lowering the weave density of the fiber is known. These methods, however, have a difficulty in satisfying the performance necessary for airbags because the air permeability becomes higher even though the rigidity can be lowered. Therefore, as a method for lowering the air permeability of the woven fabric, a technique of using a fiber having a modified cross section has been proposed.

Patent Document 3 discloses a base fabric for an airbag which has a Y-shaped or a T-shaped cross section and is obtained by weaving fibers having a specific modification degree. It discloses herein that the base fabric is heated under a pressure and compressed to make the fabric texture packed, compressed, and compacted, and the single yarn fibers that constitute weaving yarns are deformed to make warps and wefts meshed with each other, so that low air permeability is achieved.

Patent Document 4 discloses the technique for achieving low air permeability, in which the present inventors have remarked that the squared-analogous cross-section yarns are difficult rolling and the woven fabric exhibit high shielding effect in the longitude and latitude directions, so that the airbag-use woven fabric is woven with fiber having substantially square-shaped cross section.

PRIOR ART DOCUMENTS

Patent Documents

Patent Document 1: JP-3144307 B2
Patent Document 2: JP-3859135 B2
Patent Document 3: JP-A-8-199449
Patent Document 4: JP-4685904 B2

DISCLOSURE OF THE INVENTION

Problems to be Solved by the Invention

According to the method of making the single yarn fineness thinner to achieve low air permeability as disclosed in Patent Document 1, the air permeability can be lowered to a certain level, but it has been difficult to further lower the air permeability.

When an airbag is produced, the airbag-use woven fabric undergoes an external force in a direction perpendicular to the fiber axis in the folding step or the like. The woven fabric obtained by weaving the flat cross-section yarn (Patent Document 2), however, has a problem in that when the structure such that "the longer diameters of the single yarn cross section are arranged in stack" collapses in such step, the air permeability conversely increases (deteriorates).

Further, in addition to low air permeability, it is required that the airbag-use woven fabric is light in weight, flexible, has a compact folded shape, and exhibits good package ability. In Patent Document 4, however, the flexibility or package ability of the woven fabric has not been studied. On the other hand, Patent Document 3 discloses that by heating the woven fabric under a pressure and applying a compressive pressure to the heated woven fabric to achieve low air permeability and package ability. However, such heating and compressive pressure have disadvantageously lowered the tear strength of the woven fabric.

The present invention has been made by focusing on the above circumstances, and an object thereof is to solve the problems in the prior art. That is, an object of the present invention is to provide an airbag-use woven fabric that achieves both low air permeability and low basis weight of the airbag, and is light in weight and compact in size, and an airbag that uses the airbag-use woven fabric.

It is another object of the present invention to provide an airbag-use woven fabric and an airbag, having low air permeability, being flexible, and exhibiting good package ability without impairing mechanical strength of the woven fabric.

Solutions to the Problems

The present invention capable of solving the above-mentioned problems consists of the following constitutions (first invention):

1. An airbag-use woven fabric comprising a base fabric, wherein a yarn widening ratio of unwoven weaving yarn of fibers that constitute the base fabric is not less than 2.4 and not more than 3.5.

2. The airbag-use woven fabric according to the above 1, wherein the fibers that constitute the base fabric comprise fibers in which single yarn filaments have a substantially triangular cross sectional shape and a modification degree of 1.3 to 2.2.

3. The airbag-use woven fabric according to the above 1 or 2, wherein the fibers that constitute the base fabric comprise fibers in which single yarn filaments have a substantially triangular cross sectional shape and a modification degree of 1.4 to 2.0.

4. The airbag-use woven fabric according to any one of the above 1 to 3, wherein the cross section of a single yarn filament includes a triangular shape formed by connecting points which contact a circumscribed circle of the cross section of the single yarn filament in the fibers that constitute a base fabric.

5. The airbag-use woven fabric according to any one of the above 1 to 4, wherein the fibers are polyamide fibers.

6. The airbag-use woven fabric according to any one of the above 1 to 5, wherein the fibers have a fineness of 100 dtex to 600 dtex.

7. The airbag-use woven fabric according to any one of the above 1 to 6, wherein the airbag-use woven fabric has an air permeability under a pressure difference of 20 kPa of 0.1 $L/cm^2/min$ to 0.7 $L/cm^2/min$.

8. The airbag-use woven fabric according to any one of the above 1 to 7, wherein the folded airbag-use woven fabric has an air permeability under a pressure difference of 20 kPa of 0.1 $L/cm^2/min$ to 0.7 $L/cm^2/min$ as measured by the following method.

[Air permeability of folded woven fabric under a pressure difference of 20 kPa]

A 20 cm square specimen is cut out from an optional portion excluding a range of 30 cm from both widthwise ends of the woven fabric, and the cut specimen is folded in half along a fiber axial direction (a), then folded in half along a fiber axial direction (b) which is perpendicular to the fiber axial direction (a), again folded in half along the fiber axial direction (a), and finally folded in half along the fiber axial direction (b) perpendicular to the fiber axial direction (a), thereby obtaining a 5 cm square folded specimen. A load of 50 N is applied over the entire folded specimen for 1 minute, and the specimen is then unfolded into a 20 cm square shape and allowed to stand for 1 minute in the unfolded state. Then, as a measurement portion, a circle having a diameter of 10 cm which is centered on an intersection point of the first fold and the second fold, is measured for air permeability under a pressure difference of 20 kPa.

9. An airbag-use woven fabric, comprising single yarn fibers having a substantially triangular cross sectional shape and a modification degree of 1.3 to 2.2;
having a tear strength of not less than 120 N; and
having an air permeability under a pressure difference of 20 kPa of not more than 0.65 $L/cm^2/min$.

10. The airbag-use woven fabric according to the above 9, wherein the folded airbag-use woven fabric has an air permeability under a pressure difference of 20 kPa of not more than 0.65 $L/cm^2/min$ as measured by the following method.

[Air permeability of folded woven fabric under a pressure difference of 20 kPa]

A 20 cm square specimen is cut out from an optional portion excluding a range of 30 cm from both widthwise ends of the woven fabric, and the cut specimen is folded in half along a fiber axial direction (a), then folded in half along a fiber axial direction (b) which is perpendicular to the fiber axial direction (a), again folded in half along the fiber axial direction (a), and finally folded in half along the fiber axial direction (b) perpendicular to the fiber axial direction (a), thereby obtaining a 5 cm square folded specimen. A load of 50 N is applied over the entire folded specimen for 1 minute, and the specimen is then unfolded into a 20 cm square shape and allowed to stand for 1 minute in the unfolded state. Then, as a measurement portion, a circle having a diameter of 10 cm which is centered on an intersection point of the first fold and the second fold, is measured for air permeability under a pressure difference of 20 kPa.

11. The airbag-use woven fabric according to the above 9 or 10, wherein a rate of change in the air permeability of the folded woven fabric under a pressure difference of 20 kPa as measured by the method defined in the above 10, with respect to the air permeability of the woven fabric under a pressure difference of 20 kPa is not more than 150%.

12. The airbag-use woven fabric according to any one of the above 9 to 11, having a package ability specified in accordance with ASTM D6478 of 1200 $cm^3$ to 2400 $cm^3$ and a stiffness specified in accordance with ASTM D4032 of 5 N to 22 N in both warp and weft directions.

13. The airbag-use woven fabric according to any one of the above 9 to 12, wherein the fibers that constitute the woven fabric have a total fineness of 200 dtex to 500 dtex and a cover factor of not more than 2300.

14. The airbag-use woven fabric according to any one of the above 9 to 13, wherein lines connecting apexes of a substantially triangular shape that appears in the cross section of the single yarn fiber are located inside the outer periphery of the single yarn fiber cross section.

15. An airbag using the woven fabric defined in any one of the above 1 to 14.

16. A method of manufacturing the airbag-use woven fabric defined in any one of the above 9 to 14, comprising the steps of:
weaving multifilaments; and
naturally drying the woven grey fabric or heat-treating the woven grey fabric at 20° C. to 190° C.

17. A method of manufacturing the airbag-use woven fabric defined in any one of the above 9 to 14, comprising the steps of:
weaving multifilaments;
scouring the woven grey fabric with water of 50° C. to 100° C.; and
heat-treating the scoured grey fabric at 100° C. to 150° C.

18. A method of manufacturing the airbag-use woven fabric defined in any one of the above 9 to 14, comprising the steps of:
weaving multifilaments;
scouring the woven grey fabric with water of 30° C. to 90° C.; and
heat-treating the scoured grey fabric at 110° C. to 190° C. under an overfeeding percentage in a traveling direction of the grey fabric of 1.5% to 6.0% and an overfeeding percentage in a direction perpendicular to the traveling direction of 1.0% to 4.0% relative to the length in the direction perpendicular thereto.

Effects of the Invention

According to the present invention, an airbag-use woven fabric that is light in weight and compact in size, having low air permeability, and an airbag that uses the same can be provided. That is, multifilaments that constitute the airbag-use woven fabric of the present invention have high packing property (closest packing property) between single filaments that constitute fibers at the weaving stage, which thereby reduces the thickness of the airbag-use woven fabric. When a stress is applied to the fiber, that is, a pressure develops in a direction perpendicular to the fiber axis, a single yarn filament itself exists spreading as the fiber because the single yarn filament itself easily moves, and the effect of filling a gap (a knot) between adjacent fibers occurs. This allows the woven fabric to have low air permeability.

Since the airbag-use woven fabric of the present invention contains substantially triangular cross-sectional fibers with a specific modification degree in weaving yarns, the airbag-use woven fabric can exhibit flexibility and good package ability while having low air permeability and the mechanical strength of the woven fabric.

BRIEF DESCRIPTION OF THE DRAWINGS

FIG. 1 is a view illustrating a nozzle having a modified cross section and how to determine a degree of modification thereof.

FIG. 2 is a cross-sectional schematic view illustrating an example of a preferred cross-sectional shape of a single yarn fiber and how to determine a degree of modification of the cross section of this single yarn fiber.

FIG. 3 is a cross-sectional schematic view illustrating a cross-sectional shape of another single yarn fiber and how to determine a degree of modification of the cross section of this single yarn fiber.

FIG. 4 is a scanning electron microscope photograph of a cross section of the single yarn fiber obtained in Example 1-1.

FIG. 5 is a scanning electron microscope photograph of a cross section of the single yarn fiber obtained in Comparative Example 1-3.

FIG. 6 is a scanning electron microscope photograph of a cross section of the single yarn fiber obtained in Example 2-1.

FIG. 7 is a scanning electron microscope photograph of a cross section of the single yarn fiber obtained in Comparative Example 2-3.

FIG. 8 is a schematic view for explaining the method of measuring the yarn widening ratio.

MODE FOR CARRYING OUT THE INVENTION

The present invention includes
(I) an airbag-use woven fabric containing a base fabric, in which a yarn widening ratio of unwoven weaving yarn of fibers that constitute the base fabric is not less than 2.4 and not more than 3.5; and an airbag using the airbag-use woven fabric (hereinafter referred to as the first invention in some cases)

(II) an airbag-use woven fabric, containing single yarn fibers having a substantially triangular cross-sectional shape and a modification degree of 1.3 to 2.2; and having a tear strength of not less than 120 N; and having an air permeability under a pressure difference of 20 kPa of not more than 0.65 L/cm$^2$/min (hereinafter referred to as the second invention in some cases).

First, the first invention will be described.

Materials of the fibers that constitute the airbag-use woven fabric are not particularly limited. For example, aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate may be used. Other examples thereof include all-aromatic polyester fiber, ultra-high-molecular-weight polyethylene fiber, poly-p-phenylenebenzobisoxazole fiber (PBO fiber), polyphenylene sulfide fiber, polyether ketone fiber, etc. However, when economy is taken into consideration, the polyester fiber and the polyamide fiber are especially preferred. Of these, Nylon 66 composed of a polyhexamethylene adipamide fiber is particularly preferred in terms of durability against high temperature gas.

Relative viscosity of Nylon 66 by sulfuric acid is preferred to be not less than 3.2. When the relative viscosity is less than 3.2, the tenacity required for the airbag-use woven fabric may be insufficient. The relative viscosity is more preferably not less than 3.3, and even more preferably not less than 3.4. However, when the relative viscosity is excessively high, not only the cost for polymerization is apt to become high but also the operation of spinning may become bad. The relative viscosity is preferably not more than 3.6, and more preferably not more than 3.5.

A part or all of the fibers that constitute the airbag-use woven fabric may be produced from a recycled raw material. Further, for the purpose of enhancing the step passing property in the manufacturing step, the fibers may contain various kinds of additives. Examples of the additive used therefor include antioxidant, thermostabilizer, smoothening agent, antistatic agent, thickener and flame retardant. Further, the fibers may be a dope-dyed yarn or a yarn which is dyed after filature.

The fibers (multifilaments) that constitute the airbag-use woven fabric can be produced in accordance with the following standard procedures: Raw material resin is melt-extruded using a uniaxial or a biaxial extruder, the resulting resin is weighed using a gear pump, and the weighed resin is extruded into a nozzle via an appropriate metal nonwoven filter to give a fibrous melt. Thereafter, the fibrous melt is directly passed through a heating cylinder immediately below the nozzle, cooled by cooling air, and then applied with a spin finish oil. The fibrous melt thus applied is wound around a take-up roller, drawn as is, and then subjected to entanglement treatment, so that fibers can be obtained.

As for Nylon 66, the nozzle temperature is preferably in the range of not less than 280° C. and not more than 320° C. When the nozzle temperature is less than 280° C., pressure loss at the time when Nylon 66 passes through the nozzle is increased, resulting in difficulty in spinning. When the nozzle temperature is set higher than 320° C., deterioration or gelation of the polymer occurs, which causes filter clogging or yarn breakage. Therefore, not only productivity may be lowered, but also fiber strength may be reduced.

A device for making the temperature of the nozzle surface uniform, such as a heat-retaining cylinder or a heating cylinder, may be installed between the nozzle and a take-up position. For example, the length of the heating cylinder is preferably in the range of not less than 2 cm and not more than 50 cm from the nozzle. When the length is shorter than 2 cm, cooling air in the subsequent cooling step enters into the heating cylinder, which may fail to achieve uniform temperature of the nozzle surface. Therefore, unevenness may tend to occur between the single yarn filaments. When the length is larger than 50 cm, yarn unevenness in the longitudinal direction, so-called resonance, may tend to periodically occur.

The temperature of the cooling air used to cool the melted thread is preferably in the range of 15° C. to 30° C. When the temperature is lower than 15° C., difference in physical properties such as modification degree, strength, or the like between the single yarn filaments may increase. When it is higher than 30° C., the modification degree of the single yarn filament cross section may be lowered.

The velocity of the cooling air is preferably in the range of not less than 0.1 m/sec and not more than 1 m/sec. When the velocity is less than 0.1 m/sec, cooling is failed, which may tend to cause unevenness between the single yarn filaments. When the velocity exceeds 1 m/sec, the cooling rate is different between the upstream side and the downstream side of the cooling air, which may tend to cause unevenness between the single yarn filaments.

A draft ratio defined by the following formula is preferably not less than 100 and not more than 150. The draft ratio is calculated by the following formula.

$$\text{Draft ratio} = \text{take-up roller speed (m/min)}/\{\text{single opening volume discharge amount (m}^3/\text{min})/(\text{nozzle opening cross-sectional area (m}^2))\}$$

When this draft ratio is lower than 100, the yarn sway becomes large, which may tend to cause fusion between the single yarn filaments or yarn breakage. When the draft ratio is higher than 150, uneven orientation in the cross section of the single yarn filament, in particular, orientation difference between the center of the cross section and the vicinity of the apexes of the triangular shape becomes large, which may tend to cause a problem of lowering the strength.

The draw ratio is preferably not less than 4.5 times and not more than 4.9 times. When the draw ratio is less than 4.5 times, the strength may be reduced. When the draw ratio is larger than 4.9 times, uneven orientation occurs in the cross section of the single yarn filament, and a crack is apt to be generated in the single yarn filament, which may tend to lower the fiber strength, cause yarn breakage during production, or the like.

The draw temperature is preferably in the range of not less than 20° C. and not more than 240° C., although it depends on the weaving method to be described later. When the draw temperature is lower than 20° C., yarn breakage may occur before the draw ratio reaches the required value. When the draw temperature exceeds 240° C., the yarn is cut by fusion, so that drawing may be difficult.

In the present invention, entanglement by fluid treatment with air pressure or the like, so-called interlacing treatment is preferably minimized. The fiber at the raw yarn stage has preferably a degree of entanglement of not less than 5/m and not more than 30/m.

To achieve this, it is preferable that interlacing treatment is performed under substantially no tension, that is, after completion of the drawing treatment until the fibers are wound up, so that the number of entanglement of the fiber is adjusted.

When the degree of entanglement is excessively low, fluff is apt to occur in the subsequent step, that is, a weaving step, so that the quality may deteriorate. On the contrary, when the degree of entanglement is excessively high, entanglement remains even in a state of woven base fabric, so that the yarn widening ratio to be described later may decrease. The fiber at the raw yarn stage has a degree of entanglement of preferably not less than 8/m and more preferably not less than 10/m. The upper limit thereof is not more than 28/m and more preferably not more than 25/m.

As the mechanical characteristics of the fiber in the present invention, in order to satisfy the mechanical characteristics required when the woven fabric is used for non-coated airbag, the cutting strength is preferably not less than 7.0 cN/dtex, and more preferably not less than 7.5 cN/dtex. Although higher cutting strength is preferable, the cutting strength is preferably not more than 9.5 cN/dtex in view of production yield or the like.

The single yarn fineness of the filament that constitutes the fiber is preferably not less than 1 dtex and not more than 8 dtex. When the single yarn fineness exceeds 8 dtex, the air permeability as an airbag after weaving may be increased. On the other hand, when the single yarn fineness is excessively low, the productivity of the fibers may be deteriorated. The single yarn fineness is preferably not less than 2 dtex and not more than 7.5 dtex, and more preferably not less than 2.5 dtex and not more than 6.5 dtex.

The number of single yarn filaments that constitute the fibers of the present invention is preferably not less than 40. When the number of filaments is less than 40, poor package ability is apt to result, which is not preferable. On the other hand, when the number of filaments exceeds 200, the productivity of the fibers is deteriorated, which is not preferable. The number of filaments is preferably not less than 50, and more preferably not less than 60. Further, the number of filaments is preferably not more than 180, and more preferably not more than 160.

The fibers of the present invention have a total fineness of preferably not less than 100 dtex and not more than 600 dtex, and more preferably not less than 150 dtex and not more than 500 dtex. When the total fineness is less than 100 dtex, the fibers have insufficient tensile strength and tear strength as a base fabric for an airbag, and may pose a strength problem. When the total fineness exceeds 600 dtex, there is no problem in strength, but the flexibility of the woven fabric is impaired, which may deteriorate package ability or which makes the surface of the fabric rigid, so that the skin of a human body may be damaged upon a collision.

The fibers (multifilaments) that constitute a base fabric in the present invention preferably include fibers in which single yarn filaments have a substantially triangular cross-sectional shape.

For the purpose of obtaining single yarn filaments having a triangular cross-sectional shape, a method in which, as a nozzle opening for discharge, three discharge openings are arranged so as to have a substantially triangular shape, and resins discharged by die swell phenomenon in which a melt polymer is expanded immediately after extruded from the nozzle, are bonded to form single yarn filaments; a method of using a so-called Y-shaped discharge opening shape which allows discharge from three linear slits that are provided from the center point toward the apexes of the triangular shape; or a method of forming a discharge opening shape in which three substantially isosceles triangular shapes are arranged so that each bottom side intersects with the center as shown in FIG. 1, may be used.

For the purpose of obtaining single yarn filaments having a desired triangular cross-sectional shape, in particular, the method of forming the discharge opening shape as shown in FIG. 1 is preferred. The use of such shape makes it easy to adjust the modification degree of the filament. The modification degree of the single yarn filament significantly depends on the modification degree of the nozzle which can be represented by the ratio of the radius of the circumscribed circle to the radius of the inscribed circle. Specifically, the circumscribed circle is indicated by a circle passing through three apexes that are present on the outermost sides of three substantially isosceles triangular shapes, the three apexes being shown as A, B, and C in FIG. 1; and the inscribed circle is indicated by a circle passing through intersection points of adjacent equilateral sides of the substantially isosceles triangular shapes, the intersection points being shown as D, E, and F in FIG. 1.

The modification degree of the nozzle is preferably not less than 2 and not more than 10, and more preferably not less than 3 and not more than 8. When the modification degree is less than 2, the cross section of the single yarn filament after yarn-making tends to have an almost round cross section. When the modification degree exceeds 10, the cross section of the single yarn filament after yarn-making tends to be nearly Y-shaped cross section.

In the present invention, the single yarn filament that constitutes the fibers preferably has nearly a regular triangular cross section. Since the cross section is a substantially regular triangular shape, the single yarn filaments contact each other along the fiber axis in the longitudinal direction to form a plane, so that good air permeability (low air permeability) is easily obtained. That is, in the case of a round cross section, the single yarn filament comes in contact with adjacent ones at one point in the cross section, so that the effect of suppressing the air permeability tends to be reduced. Further, when the single yarn filament has an excessively large modification degree, that is, has a Y-shaped cross section, the single yarn filament comes in contact with adjacent ones at several points. However, since any of the contacts are made at points, the effect of reducing the air permeability tends to be limited.

For the purpose of increasing the contact area between the single yarns, a method of forming the cross section of the single yarn filament into a flat shape is also known. This is a technique intended to achieve a woven fabric having low air permeability by arranging the longer diameters of the flat cross section in stack in the woven fabric to increase the contact area between the single yarn filaments in the longitudinal direction.

However, the method of forming the cross section of the single yarn filament into a flat shape has a problem of increasing the air permeability because in the case where the woven fabric undergoes an external force in a direction perpendicular to the fiber axial direction, such as in the steps, such as folding, accommodating, or the like that is required during production of an airbag, the structure in which "the longer diameters of the single yarn cross sections are arranged in stack" collapses, that is, when the longer diameter axis rotates in a direction where the laminated structure is disturbed, the contact area significantly reduces. According to the present invention, it is possible to prevent the air permeability from deteriorating due to the external force in the perpendicular direction as low as not more than 1.5 times from this base fabric state In the present invention, by forming the cross-sectional shape of the single yarn filament into a substantially triangular shape, the contact area between the single yarns increases, and at the same time, even in the case where the woven fabric undergoes the external force in the direction perpendicular to the fiber axial direction that is generated in the airbag production step, the contact area between the single yarns does not reduce much, and the initial yarn state is easily maintained, so that the air permeability less increases (deteriorates).

In general, a modification degree is used to indicate the modified shape of the cross section of the single yarn filament. In the present invention, the modification degree is preferably not less than 1.3 and not more than 2.2. In theory, a regular triangular cross-sectional shape is preferred. With actual raw yarns, however, a phenomenon (die swell phenomenon) in which a melted resin is expanded when extruded from a nozzle occurs, so that the cross-sectional shape of the single yarn fiber has rounded apexes. Therefore, in the present invention, the most preferred modification degree is mainly around 1.6. When the modification degree is less than 1.3, the cross-sectional shape becomes nearly round, so that the single yarns provides almost point contact, resulting in increase of the air permeability. At the same time, the packing property deteriorates as yarns, which tends to increase (deteriorate) the air permeability as woven fabrics. Similarly, when the modification degree is larger than 2.2, voids occur between the single yarn filaments, so that the air permeability tends to increase (deteriorate) as woven fabrics. The modification degree of the single yarn filament is more preferably not less than 1.4 and not more than 2.0, and even more preferably not less than 1.5 and not more than 1.8.

Further, in the present invention, the single yarn filament that constitutes the fibers is more preferably in a state where the single yarn filament cross section (outer periphery) contains a triangular shape having three apexes at which the single yarn filament cross section (outer periphery) contact a circle circumscribing the single yarn filament cross section. When the single yarn filament cross section contains a triangular shape formed by connecting the apexes on the circumscribed circle of the cross section, this means that intersection points of perpendicular bisectors of line segments that connect the apexes on the circumscribed circle with the single yarn filament cross section are located outside the triangular shape that is formed by connecting the apexes on the circumscribed circle (FIG. 2).

When the single yarn filament cross section does not contain the triangular shape formed by connecting the apexes on the circumscribed circle, this means that the single yarn filament has a substantially approximate Y-shaped cross section (FIG. 3). The cross section of the single yarn filament in the present invention is ideally a regular triangular shape, and when the cross section becomes nearly Y-shaped, voids occur between the single yarn filaments, so that the air permeability tends to increase (deteriorates) as woven fabrics.

The air permeability of the airbag-use woven fabric under a pressure difference of 20 kPa is preferably not more than 0.7 L/cm$^2$/min. The air permeability is more preferably not more than 0.6 L/cm$^2$/min, and even more preferably not more than 0.5 L/cm$^2$/min. When the air permeability is more than 0.7 L/cm$^2$/min, it may be difficult to design an airbag which is lightweight and compact. Although lower air permeability is preferable, the air permeability of a non-coated airbag is preferably not less than 0.1 L/cm$^2$/min. It is not preferable to set the air permeability lower than 0.1 L/cm$^2$/ min in terms of production cost. The air permeability is more preferably not less than 0.15 L/cm$^2$/min and even more preferably not less than 0.2 L/cm$^2$/min.

As a method for evaluating whether or not, in the case where the woven fabric undergoes an external force in a direction perpendicular to the fiber axial direction in the steps necessary to produce an airbag, such as folding, accommodating, or the like, the structure such that "the longer diameters of the single yarn cross section are arranged in stack" collapses, so that the air permeability changes, a test of "high-pressure air permeability after folding" has been conducted in the present invention. This test is intended to reproduce the state of a base fabric that has been mounted in a vehicle as an airbag and measure the air permeability at this point. The measurement method is as follows.

Five 20 cm square specimens are cut out from an optional portion excluding a range of 30 cm from both widthwise ends (selvages) of the woven fabric, and each cut specimen is folded in half along a fiber axial direction (a), then folded in half along a fiber axial direction (b) which is perpendicular to the fiber axial direction (a), again folded in half along the fiber axial direction (a), and further folded in half along the fiber axial direction (b), thereby obtaining a 5 cm square folded specimen. A load of 50 N is applied over the entire folded specimen for 1 minute, and the specimen is then unfolded into a 20 cm square shape and allowed to stand for 1 minute in the unfolded state. Then, as a measurement portion, a circle having a diameter of 10 cm which is centered on an intersection point of the first fold and the second fold, is measured for air permeability under a pressure difference of 20 kPa with a high-pressure air permeability measuring device.

The air permeability after folding (air permeability of the folded base fabric under a pressure difference of 20 kPa) is preferably not more than 0.7 L/cm$^2$/min. The air permeability is more preferably not more than 0.6 L/cm$^2$/min, and most preferably not more than 0.5 L/cm$^2$/min. Lower air permeability is preferable and the air permeability of a non-coated airbag is preferably not less than 0.1 L/cm$^2$/min.

In the high-pressure air permeability test (air permeability under a pressure difference of 20 kPa) before and after folding of the airbag-use woven fabric, the amount of change in the air permeability is preferably not more than 0.05 L/cm$^2$/min. The change of not more than 0.03 L/cm$^2$/min is more preferable because the airbag is uniformly developed.

When the airbag-use woven fabric is woven, the warp tension upon weaving is preferably not less than 0.1 cN/dtex and not more than 0.5 cN/dtex. It is more preferably not less than 0.2 cN/dtex and not more than 0.4 cN/dtex, and even more preferably not less than 0.25 cN/dtex and not more than 0.35 cN/dtex. When the warp tension is lower than 0.1 cN/dtex, weave density adjustment is so difficult and reduction in the degree of entanglement of the warp is so little that a woven fabric having a specified low air permeability may not be obtained. When the warp tension is higher than 0.5 cN/dtex, a force applied to the warp is so large that fluff may be apt to occur.

As a loom to be used upon weaving of an airbag-use woven fabric, a waterjet loom, an airjet loom, a rapier loom, a multiphase weaving machine, or the like is preferable, and the woven fabric can be produced by using such loom. In particular, a waterjet loom is preferable from the viewpoint of higher speed, widening, or machine cost.

The method of weaving an airbag-use woven fabric is not particularly limited, and a plain weaving is preferred when uniformity of the properties of the woven fabric is taken into consideration. With regard to the yarn used, its warp and weft may not be single and there is no problem at all even when, for example, size, yarn numbers, and fiber type are different as long as tenacity, air permeability, and the like that satisfy the performance of airbag are satisfied.

After the airbag-use woven fabric is woven, the grey fabric is preferably subjected to hot water treatment to pass through a hot water bath at 50 to 100° C. The tension upon the hot water treatment is preferably not more than 0.04 cN/dtex. The basic fabric is sufficiently shrunk by the hot water treatment under the specified tension, so that the thread in the grey fabric is rearranged. At the same time, a hydrogen bond in Nylon 66 is cleaved by water swelling, so that more flexible basic fabric is easily obtained. In the case where the temperature of the hot water bath is less than 50° C., and in the case where the hot water treatment is not performed, the basic fabric is not sufficiently shrunk, which is not preferable. The temperature thereof is in the range of more preferably 60 to 98° C. and even more preferably 70 to 95° C. When the tension of the warp exceeds 0.04 cN/dtex, the woven fabric cannot be freely shrunk upon the hot water treatment, and the woven fabric itself is set in a shape, so that the flexibility of the woven fabric tends to be impaired.

After the hot water treatment described above, the airbag-use woven fabric is preferably dried without heat-set processing. For the same reason as that upon the hot water treatment, the tension in the warp direction at the drying step is preferably not more than 0.04 cN/dtex and more preferably not less than 0.02 cN/dtex. A method of performing heat-set processing while the tension more than required is applied using a pin tenter or the like is also known. However, in such case, the yarn is heat-set, so that the yarn widening effect to be described later is not obtained, which is not preferable.

The drying temperature is preferably not more than 150° C. in order not to impair the flexibility of the airbag-use woven fabric. It is more preferably not more than 140° C. Although lower drying temperature is preferable, an excessively low drying temperature needs a longer drying time, which is not industrially preferable. The drying temperature is preferably not less than 100° C., and more preferably not less than 110° C.

The airbag-use woven fabric preferably has a cover factor (CF), which is calculated by the following formula 1, of not more than 2300. When the cover factor exceeds 2300, poor compactability is apt to result. On the other hand, when it is less than 1800, the air permeability tends to increase. The cover factor is more preferably not less than 1900 and not more than 2180.

CF=[density of warp (warp number/2.54 cm)×√(fineness of warp (dtex)×0.9)]+[density of weft (weft number/2.54 cm)×√(fineness of weft (dtex)×0.9)]  (Formula 1)

The fibers that constitute the airbag-use woven fabric include fibers in which a yarn widening ratio taken out from the airbag-use woven fabric (hereinafter also referred to as unwoven weaving yarn) is not less than 2.4 and not more than 3.5. Although the widening ratio is obtained by the measurement method to be described later, such method is simulating the multifilament state at the time when the woven fabric is developed as an airbag. A larger value of the widening ratio means that lower air permeability is easily achieved. That is, when an airbag is developed, a tensile tension in the fiber axial direction acts and at the same time, a "force from a perpendicular direction" from a yarn perpendicular to the fiber axis also acts. Although it is considered that the single yarn filaments move in a bundling direction by the tension in the fiber axial direction, it is also considered that the single yarn filament is widened by the "force from a perpendicular direction" and moves in the direction of packing the knot. In the measurement method to be described later, a 1.52 times larger load (g) than the one relative to the total fineness (dtex) of the fibers is applied using a value of which a force applied to the fabric upon development of an airbag is derived from a calculation. According to this measurement method, a tensile tension to be applied to the multifilaments that constitute the basic fabric upon development of the airbag, and a pressure from the latitude direction applied by the perpendicular yarn can be reproduced.

When the widening ratio of the unwoven weaving yarn is less than 2.4, the widening is less effective, and the effect of filling the knot is deteriorated. This prevents the air permeability from reducing, which is not preferable. The widening ratio of the unwoven weaving yarn is not less than 2.5, and more preferably not less than 2.6. The upper limit thereof is not particularly limited, and it is not more than 3.5, preferably not more than 3.4, more preferably not more than 3.2, and even more preferably not more than 3.0, in view of the fact that the yarn is actually widened.

High yarn widening ratio can be achieved by the single yarn filament having a substantially triangular cross section and by the fiber at the raw yarn stage having a low degree of entanglement. Such substantially triangular cross section reduces the yarn width because of high packing property in a state where only a tensile tension is applied, and when a stress is applied from a direction perpendicular to the fiber axis, the filament serves as a wedge to allow the entire yarn to widen in the latitude direction. The cross-sectional shape indicates that when a force perpendicular to the fiber axial direction is applied, the single yarn is easily closest-packed. This is considered as one reason why the airbag basic fabric has a low air permeability. Therefore, from the viewpoint of further lowering the air permeability of the airbag-use woven fabric, the widening ratio of the unwoven weaving yarn is preferably not less than 2.4 and not more than 3.5 for both warp and weft. In 100% of fibers that constitute the airbag-use woven fabric (total of warp and weft), not less than 25% of the single yarn fiber of which the widening ratio is in the above range is preferably used. It is more preferably not less than 50%, and most preferably 100%.

The degree of entanglement of the yarn taken out from the fabric (unwoven weaving yarn) is preferably not more than 20/m. Low degree of entanglement of the unwoven weaving yarn makes the single yarns easily spread, which can contribute to reduction of the air permeability. At the weaving step to produce a woven fabric, the degree of entanglement tends to be reduced by a tension imparted to the yarn. In terms of the above-mentioned yarn widening ratio, the degree of entanglement is preferably lower. The degree of entanglement of the unwoven weaving yarn is preferably not more than 15/m, more preferably not more than 10/m, and even more preferably not more than 8/m. The lower limit thereof is not particular limited and may be 0/m.

Next, the airbag-use woven fabric and the airbag according to the second invention will be described.

The airbag-use woven fabric of the present invention contains single yarn fibers having a substantially triangular cross-sectional shape and a modification degree of 1.3 to 2.2; has a tear strength of not less than 120 N; and has an air permeability under a pressure difference of 20 kPa of not more than 0.65 L/cm$^2$/min.

The present inventors have found that instead of conventionally used fibers having a round cross section, a modified cross section, or the like, substantially triangular cross-sectional fibers having a specific modification degree are used to weave an airbag-use woven fabric, so that a woven fabric which exhibits flexibility, becomes compact by folding, and has good package ability while having low air permeability and maintaining the mechanical strength of the woven fabric, can be obtained, and the present invention has been perfected thereby. The present invention will be described hereinbelow in detail.

Materials of the fibers that constitute the airbag-use woven fabric of the present invention are not particularly limited. Examples thereof include aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate. Besides the above, all-aromatic polyester fiber, ultra-high-molecular-weight polyethylene fiber, poly-p-phenylenebenzobisoxazole fiber (PBO fiber), polyphenylene sulfide fiber, and polyether ketone fiber, etc. can be used. However, when economy is taken into consideration, the polyester fiber and the polyamide fiber are especially preferred. Of these, Nylon 66 composed of a polyhexamethylene adipamide fiber is particularly preferred in terms of durability against high temperature gas.

In the case where Nylon 66 is used as a fiber constituting the airbag-use woven fabric, Nylon 66 having a relative viscosity by sulfuric acid of not less than 3.2 is preferred. When the relative viscosity is less than 3.2, the tenacity required for the airbag-use woven fabric may be insufficient. The relative viscosity is more preferably not less than 3.3, and even more preferably not less than 3.4. However, when the relative viscosity is excessively high, not only the cost for polymerization is apt to become high but also the operation of spinning tends to become worse. Therefore, the relative viscosity is preferably not more than 3.6, and more preferably not more than 3.5.

A fiber obtained from raw materials that has been recycled from plastic waste materials may be used in a part or all of the fibers that constitute the woven fabric. The material that constitutes the fiber may contain various kinds of additives for enhancing the step passing property in the manufacturing step. Examples of the additive used therefor include antioxidant, thermostabilizer, smoothening agent, antistatic agent, thickener and flame retardant. Further, the fibers that constitute the airbag-use woven fabric may be a dope-dyed yarn or a yarn which is dyed after filature.

In the airbag-use woven fabric of the present invention, it is important to use single yarn fibers in which the shape of the cross section perpendicular to the fiber axial direction is a substantially triangular shape (hereinafter simply referred to as substantially triangular cross-sectional fibers in some cases).

The present inventors consider that the reason why a woven fabric having a compact folded shape and exhibiting good package ability is obtained by using the fibers in which the single yarn fibers have a substantially triangular cross-sectional shape, is as follows: As one reason for exhibiting good package ability, in the fiber before folding of the woven fabric, the single yarn fibers having a substantially triangular cross-sectional shape are adjacent to each other and some voids are present between the single yarn fibers. By folding such woven fabric, the single yarn fibers move at a folding line in a direction where those voids are filled, so that the fibers are closely packed. In other words, it is deduced that the movement of the single yarn fibers makes the woven fabric thinner and at the same time, lowers the rigidity of the woven fabric itself, so that the woven fabric has a compact folded shape and exhibits good package ability. It is also considered that even though the single yarn fibers move, the air permeability is hardly increased because such movement reduces voids in the fibers.

In order to lower the stiffness of the woven fabric and to achieve a compact folded shape, it is effective to reduce the thickness of the woven fabric itself. To achieve this, it has been known that the fineness of the fiber or the density of the woven fabric is reduced. However, by using the substantially triangular cross-sectional fibers having a specific modification degree as described above, a woven fabric having flexibility and exhibiting good package ability is obtained without reducing the fineness or the density of the woven fabric. This has been also found for the first time by the present inventors. Usually, fibers to be bent at the folding line of a woven fabric are deformed because a tension in the fiber axial direction and a compression force from a direction perpendicular to the fiber axis are applied to the fibers. In the case of using substantially triangular cross-sectional fibers having a specific modification degree, the above-mentioned tension and compression force cause the single yarn fibers to move so that the voids in the fibers are filled, and also cause misalignment of the adjacent single yarn fibers at their interfaces, so that weaving yarns spread in the direction perpendicular to the fiber axis. Therefore, the thickness of the woven fabric reduces at the folding line. As a result of this, it is deduced that the woven fabric has a compact folded shape and has enhanced package ability as an airbag.

As reasons why the external force causes the single yarn fibers to move as described above, in the case where the shape appearing in the cross section perpendicular to the fiber axial direction of the single yarn fiber is a substantially triangular shape, the single yarn fiber has less number of apexes in the cross section as compared with fibers having other polygonal cross-sectional shapes, and the single yarns are less caught on each other.

The single yarn fibers used in the present invention has a modification degree of not less than 1.3 and not more than 2.2. The modification degree is used as an index of the modified cross-sectional shape of the single yarn fiber. In theory, a regular triangular cross-sectional shape is preferred. With actual raw yarns, however, a phenomenon (die swell phenomenon) in which a melted resin is expanded when extruded from a nozzle occurs, so that the cross-sectional shape of the single yarn fiber has rounded apexes. Therefore, in the present invention, the most preferred modification degree is mainly around 1.6. The modification degree is preferably not less than 1.35 and not more than 2.0, and more preferably not less than 1.4 and not more than 1.8. Excessively low modification degree causes a gap to occur between the single yarn fibers, so that the air permeability of the woven fabric lowers and at the same time, the movement of the single yarn fibers may be suppressed. On the other hand, excessively large modification degree causes the fiber surface irregularities to be increased, so that adjacent fibers are caught on each other, which in turn may make the single yarn fibers difficult to move.

The modification degrees of the single yarn fibers before and after weaving are not much changed, and the single yarn fibers after weaving has a similar modification degree to the single yarn fibers (raw yarns) before weaving. Therefore, the modification degree of the unwoven weaving yarn taken out from the woven fabric is preferably in the above range. The modification degree of the single yarn fiber cross section can be determined by the method described in Examples.

As for the single yarn fiber of the present invention, as shown in FIG. 2, lines connecting apexes (a, b, and c) of a substantially triangular shape (outer periphery of the single yarn fiber cross section) 34 that appears in the cross section perpendicular to its fiber axial direction are preferably located inside or on outer periphery 34 of the single yarn fiber cross section. A triangular shape 33 formed by connecting the apexes a, b, and c of the above substantially triangular shape 34 with straight lines is preferably located inside outer periphery 34 of the single yarn fiber cross section. This relationship means that intersection points 22 of perpendicular bisectors 21 of line segments ab, bc, and ca that connect apexes a, b, and c on outer periphery 34 of the single yarn fiber cross section with outer periphery 34 of the single yarn fiber cross section are located outside the triangular shape 33. In the single yarn fiber of the present invention, the shape that appears in the cross section perpendicular to the fiber axial direction is ideally a regular triangular shape. In this case, the above triangular shape 33 agrees with the outer periphery 34 of the single yarn fiber cross section.

On the other hand, for example, as the fiber shown in FIG. 3, although the single yarn fiber has a specific modification degree, shape 34' that appears in the cross section perpendicular to the fiber axial direction and straight lines (e.g., a'b') and/or shape (triangular shape 33') formed by connecting apexes (a', b' and c') of the shape 34' are not in the above-mentioned relationship. That is, triangular shape 33' is not present within outer periphery 34' of the fiber cross section (it means that the single yarn fiber cross-sectional shape is substantially approximate to Y-shape). In such case, the amount of voids between the single yarn fibers increases, not only the air permeability increases, but also the single yarn fibers are less apt to be moved within the fibers (multifilaments).

In order to allow the single yarn fibers to move easier within the multifilaments by the external force, it is preferable to lower the entanglement degree of the fibers. The fibers at the raw yarn stage have a degree of entanglement of preferably not less than 5/m and not more than 30/m. The yarn at the stage where the yarn is taken out from the woven fabric has a degree of entanglement of preferably not more than 20/m, more preferably not more than 15/m, and even more preferably not more than 8/m, as the mean value of the warp and weft. The lower limit thereof is not particularly limited and the degree of entanglement may be 0/m. When it is within the above range, an airbag-use woven fabric in which the movement of the single yarn fibers is less likely to be inhibited and low air permeability and package ability are compatible with each other can be obtained.

The fibers at the raw yarn stage have a degree of entanglement of more preferably not less than 8/m, and even more preferably not less than 10/m. The upper limit thereof is more preferably not more than 28/m, and even more preferably not more than 25/m.

The ease of movement of the above-mentioned single yarn fiber that constitutes the fibers can also be recognized by the widening ratio of the yarn (fibers) that is taken out from unwoven airbag-use woven fabric. Then, in the present invention, the widening ratio of the yarn is used as an index indicating that the single yarn fiber moves in the fibers so as to be closest-packed by an external force such as tension, and that the single yarn fiber moves in the direction perpendicular to the fiber axis by misaligning at the interfaces with adjacent single yarn fibers. A large widening ratio means that the single yarn fiber easily moves under the influence of an external force.

The widening ratio of the fibers that are taken out from the unwoven airbag-use woven fabric is preferably not less than 2.4 and not more than 3.5. When the widening ratio is less than 2.4, the single yarn fiber is less likely to move, the effect of reducing the thickness of the folded portion or the effect of enhancing the package ability tends to be small. Therefore, the widening ratio of the yarn is more preferably not less than 2.5 and even more preferably not less than 2.6. When the widening ratio is larger than 3.5, the single yarn fiber moves too easily to maintain the state of densely packing a gap between the single yarn fibers, which may lead to increase in air permeability. The widening ratio is more preferably not more than 3.4. Although either warps or wefts that constitute the airbag-use woven fabric may satisfy the widening ratio of the unwoven weaving yarn, it is preferable that both the warp and weft satisfy the above widening ratio. The widening ratio of the yarn can be obtained by the measurement method to be described later.

As the mechanical characteristics of the fibers that constitute the airbag-use woven fabric, from the viewpoint of satisfying the mechanical characteristics required for an airbag, the cutting strength is preferably not less than 7.0 cN/dtex, and more preferably not less than 7.5 cN/dtex. Although higher cutting strength is preferable, the cutting strength is preferably not more than 9.5 cN/dtex and more preferably not more than 9.0 cN/dtex, in view of production yield.

The single yarn fineness of the filament that constitutes the fibers is preferably not less than 1 dtex and not more than 8 dtex. When the single yarn fineness is excessively large, the rigidity increases when the fibers are woven as an airbag, and the thickness of the woven fabric also increase, so that good package ability may not be obtained. On the other hand, when the single yarn fineness is excessively low, the productivity of the fibers may be deteriorated. The single yarn fineness is more preferably not less than 2 dtex and not more than 7.5 dtex, and more preferably not less than 2.5 dtex and not more than 6.5 dtex.

The number of filaments that constitute the fibers is preferably not less than 40 and not more than 200. When the number of filaments is less than 40, package ability tends to become worse. On the other hand, when the number of filaments exceeds 200, the productivity of the fibers tends to be deteriorated. The number of filaments is more preferably not less than 50, even more preferably not less than 60, and more preferably not more than 180, and even more preferably not more than 160.

The total fineness of the fibers is not particularly limited, and is preferably not less than 100 dtex and not more than 600 dtex, more preferably not less than 150 dtex and not more than 500 dtex, even more preferably not less than 200 dtex and not more than 500 dtex, and especially preferably not less than 235 dtex and not more than 470 dtex. When the total fineness is less than 100 dtex, the fibers may have insufficient tensile strength and tear strength as the base fabric for the airbag. On the other hand, when the total fineness exceeds 600 dtex, there is no problem in strength, but the thickness of the woven fabric increases, and the flexibility thereof is impaired, which may deteriorate package ability or which makes the surface of the fabric rigid, so that the skin of a human body may be damaged upon a collision.

The texture of the airbag-use woven fabric is not particularly limited and is preferably a plain weaving when uniformity of the properties of the woven fabric is taken into consideration. With regard to the weaving yarn used, its warp and weft may not be the same, and size, yarn numbers, fiber type, and the like may be different as long as tenacity, air permeability, and the like that satisfy the performance of airbag are obtained. From the viewpoint that low air permeability and good package ability are compatible with each other, not less than 25% of the fibers (multifilament) containing the single yarn fiber in which the above-mentioned cross-sectional shape is a substantially triangular cross-sectional shape and has a specific modification degree is preferably used, of 100% (total of warp and weft) of the fibers that constitute the airbag-use woven fabric. Not less than 50% of the fibers is more preferably used, and 100% thereof is most preferably used.

The airbag-use woven fabric preferably has a cover factor (CF), which is calculated by the following formula 1, of not more than 2300. When the cover factor exceeds 2300, poor compactability is apt to result. On the other hand, when it is less than 1800, the low air permeability required for an airbag may not be obtained. The cover factor is more preferably not less than 1900 and not more than 2180.

$$CF = [\text{density of warp (warp number/2.54 cm)} \times \sqrt{(\text{fineness of warp (dtex)} \times 0.9)}] + [\text{density of weft (weft number/2.54 cm)} \times \sqrt{(\text{fineness of weft (dtex)} \times 0.9)}] \quad \text{(Formula 1)}$$

The airbag-use woven fabric has an air permeability under a pressure difference of 20 kPa (high-pressure air permeability) of not more than 0.65 L/cm$^2$/min. When the high-pressure air permeability exceeds 0.65 L/cm$^2$/min, an inner pressure required for an airbag may not be secured. The high-pressure air permeability is more preferably not more than 0.6 L/cm$^2$/min, and even more preferably not more than 0.5 L/cm$^2$/min.

The airbag-use woven fabric preferably has a high-pressure air permeability (air permeability under a pressure difference of 20 kPa) after folded by the specified method of not more than 0.65 L/cm$^2$/min. The airbag-use woven fabric is retracted in a specified position in the vehicle in a folded or indifferently compressed state. Therefore, when the air permeability after folding is high, the inner pressure required for restraining of a passenger tends to be less secured upon development of the airbag. The high-pressure air permeability after folding is more preferably not more than 0.6 L/cm$^2$/min, and even more preferably not more than 0.5 L/cm$^2$/min. The high-pressure air permeability of the folded airbag-use woven fabric is obtained by the method described in Examples.

Further, the airbag-use woven fabric preferably has a ratio of change in the air permeability (the following formula 2), which is represented by a ratio of the high-pressure air permeability before and after folding of not more than 150%. When the ratio of change in the air permeability exceeds 150%, it may be difficult to secure the inner pressure required for restraining of a passenger upon development of the airbag. The ratio of change in the air permeability is more preferably not more than 130%, even more preferably not more than 120%, and especially preferably not more than 110%.

$$\text{Ratio of change in air permeability (\%)} = (\text{high-pressure air permeability after folding})/(\text{high-pressure air permeability before folding}) \times 100 \quad \text{(Formula 2)}$$

The airbag-use woven fabric of the present invention preferably has a thickness of not more than 0.3 mm. The thinner the woven fabric, the more the package ability is enhanced. Therefore, the woven fabric has a thickness of more preferably not more than 0.29 mm, even more preferably not more than 0.28 mm, and even more preferably not more than 0.27 mm. However, when the woven fabric is excessively thin, the mechanical strength of the woven fabric may be reduced or it may be difficult to keep the air permeability low. Therefore, the thickness is preferably not less than 0.20 mm, more preferably not less than 0.22 mm, and even more preferably not less than 0.23 mm. As seen above, it is considered that the woven fabric can be made thinner because the substantially triangular cross-sectional fibers having a specific modification degree are characterized in that the single yarn fiber itself in the multifilament can be moved so as to be closest-packed, and the woven fabric that is constituted by such fibers can be thinner than round cross-sectional fibers or modified cross-sectional fibers that have been used in conventional airbags. Further, it is deduced that the thinner woven fabric becomes flexible, and as a result, package ability becomes good.

The airbag-use woven fabric has a stiffness specified in accordance with ASTM D4032 of preferably not less than 5 N and not more than 22 N in both warp and weft directions. When the stiffness is excessively small, the woven fabric lacks elasticity, so that a repulsive force is so small that workability upon folding of an airbag for accommodation tends to become worse. On the other hand, when it is excessively large, the woven fabric is so rigid that the package ability may be deteriorated. The stiffness is more preferably not less than 6 N and not more than 20 N, and even more preferably not more than 7 N and not less than 18 N.

The airbag-use woven fabric has a package ability specified in accordance with ASTM D6478 of not less than 1200 cm³ and not more than 2400 cm³. Less than 1200 cm³ of the package ability indicates that the thickness or weave density of the fiber to be used for woven fabric is insufficient, and the dynamic characteristics and low air permeability required for an airbag are less apt to be obtained. When the package ability exceeds 2400 cm³, the airbag-use woven fabric may be difficult to be accommodated. The package ability is more preferably not less than 1300 cm³ and not more than 2300 cm³, and even more preferably not less than 1400 cm³ and not more than 1800 cm³.

The airbag-use woven fabric has a tear strength value of not less than 120 N. The tear strength of not less than 120 N allows the woven fabric to satisfy the performance for an airbag. In particular, the airbag-use woven fabric of the present invention has less binding between the single yarn fibers that constitute the woven fabric, so that even though a tension is applied in the warp or weft direction of the woven fabric, a load is less concentrated on a specific position, thereby making the tear strength of the airbag-use woven fabric relatively higher. The tear strength is preferably not less than 125 N, and more preferably not less than 130 N. The upper limit of the tear strength is not particularly limited, and it is preferable that the airbag-use woven fabric has a tear strength of, for example, not more than 300 N.

Next, the fibers used in the airbag-use woven fabric and the method for producing the airbag-use woven fabric according to the second invention will be described.

The fibers that constitute the airbag-use woven fabric may be produced in accordance with standard procedures. For example, raw material resin is melt-extruded using a uniaxial or a biaxial extruder, the resulting resin is weighed using a gear pump, and the weighed resin is extruded into a nozzle via an appropriate metal nonwoven filter to give a fibrous melt. Thereafter, the fibrous melt is directly passed through a heating cylinder immediately below the nozzle, cooled by cooling air, and then applied with a spin finish oil. The fibrous melt thus applied is wound around a take-up roller, drawn as is, and then subjected to entanglement treatment, so that filaments can be obtained.

It is necessary that, as described above, the fibers that constitute the airbag-use woven fabric of the present invention have a substantially triangular cross-sectional shape and have a specific modification degree. For the purpose of obtaining such fibers, it is preferable that spinning is performed using a nozzle having a suitable shape. For example, a method of, using a nozzle having three discharge openings arranged so that the outer edge surrounding these openings has a substantially triangular shape, bonding resins discharged by die swell phenomenon in which a melt resin expands immediately after extruded from the nozzle, to thereby form the resin into a yarn shape; a method of discharging a melt resin from three linear slits, using a nozzle having a Y-shaped discharge opening; or a method of discharging a melt resin from a nozzle having a discharge opening shape arranged so that three substantially isosceles triangular shapes share the use of the bottom ends of the adjacent substantially isosceles triangular shapes, as shown in FIG. 1, may be used.

The modification degree of the fiber cross section significantly depends on the modification degree of the nozzle. For the purpose of obtaining a substantially triangular cross-sectional shaped fiber having a specific modification degree, the nozzle having a discharge opening shape as shown in FIG. 1 is preferably used. The use of such shaped nozzle makes it easy to adjust the modification degree of the fiber cross section.

The modification degree of the nozzle is preferably not less than 2 and not more than 10, and more preferably not less than 3 and not more than 8. Excessively low modification degree of the nozzle is apt to form the fiber cross section after yarn-making into a rounded shape. On the other hand, excessively large modification degree of the nozzle is apt to form the fiber cross section after yarn-making into a flat or nearly Y-shape.

The modification degree of the nozzle can be represented by the ratio of the radius of the circumscribed circle to the radius of the inscribed circle (radius of circumscribed circle/ radius of the inscribed circle) in the nozzle opening. When specifically described with reference to FIG. 1, circumscribed circle 11 is a circle passing through apexes A, B, and C of outer edge 13 of the nozzle discharge opening, as indicated by dashed lines in FIG. 1. On the other hand, inscribed circle 12 is indicated by alternate long and short dashed lines in FIG. 1, and when the discharge opening is regarded as a shape formed of three substantially isosceles triangular shapes having the above-mentioned apexes A, B, and C, it is a circle passing through intersection points D, E, and F of equilateral sides of adjacent substantially isosceles triangular shapes.

The nozzle temperature may be appropriately determined depending on the resin to be used, and for example, in the case of using a polyamide fiber such as nylon 66, the nozzle temperature is preferably in the range of 280° C. to 320° C. Excessively low nozzle temperature increases the pressure loss at the time when the resin passes through the nozzle, which may result in difficulty in spinning. On the other hand, when the nozzle temperature is excessively high, deterioration or gelation of the polymer tends to occur, which causes filter clogging or yarn breakage, so that not only productivity may be lowered, but also fiber strength may be reduced.

In order to make temperature of the nozzle surface uniform, a device such as a heat-retaining cylinder or a heating cylinder may be installed between the nozzle and a winding roll. For example, the length of the heat-retaining cylinder or heating cylinder is preferably in the range of not less than 2 cm and not more than 50 cm from the nozzle. When the length of the heating cylinder is shorter than 2 cm, cooling air in the subsequent cooling step enters thereinto, which may fail to achieve uniform temperature of the nozzle surface. Therefore, fineness unevenness may tend to occur between the fibers. On the other hand, when the length of the heat-retaining cylinder or heating cylinder is longer than 50 cm, yarn unevenness in the longitudinal direction, so-called resonance, may tend to periodically occur.

The temperature of the cooling air used to cool the melted thread is preferably in the range of not less than 15° C. and not more than 30° C. When the temperature of the cooling air is lower than 15° C., difference in physical properties such as modification degree, strength, or the like between the fibers may increase. On the other hand, when it is higher than 30° C., the modification degree of the fiber cross section may become too small. The temperature is more preferably not less than 18° C. and not more than 28° C., and even more preferably not less than 20° C. and not more than 25° C.

The velocity of the cooling air is preferably in the range of not less than 0.1 m/sec and not more than 1 m/sec. When the velocity is less than 0.1 m/sec, the thread may be less sufficiently cooled, which may tend to cause fineness unevenness between the fibers. On the other hand, when the velocity exceeds 1 m/sec, the cooling rate is apt to differ between the upstream side and the downstream side of the cooling air, which may cause fineness unevenness between the fibers.

When the cooled thread is wound up, the draft ratio calculated by the following formula is preferably not less than 100 and not more than 150.

Draft ratio=take-up roller speed (m/min)/
{single opening volume discharge amount (m³/min)/(nozzle opening cross-sectional area (m²))}

When the draft ratio is lower than 100, the yarn sway becomes large, which tends to cause fusion between fibers or yarn breakage. On the other hand, when the draft ratio is higher than 150, uneven orientation of the molecular chain in the cross section of the single yarn fiber, in particular, orientation difference between the center in the cross section and the vicinity of the apexes of the substantially triangular shape becomes large, which may tend to cause a problem of lowering the strength.

The draw ratio is preferably not less than 4.5 times and not more than 4.9 times. When the draw ratio is less than 4.5 times, the strength of the fiber may be reduced. On the other hand, when the draw ratio is larger than 4.9 times, uneven orientation of the molecular chain occurs in the cross section of the filament, and a crack is apt to be generated in the filament, which may tend to lower the fiber strength or cause yarn breakage during manufacture of the fiber.

The temperature at the time of drawing is preferably in the range of not less than 20° C. and not more than 240° C., although it depends on the weaving method to be described later. When the draw temperature is lower than 20° C., yarn breakage may occur before the draw ratio reaches the required value. On the other hand, when the draw temperature exceeds 240° C., the yarn is cut by fusion, so that drawing may be difficult.

In the fibers used in the airbag-use woven fabric of the present invention, entanglement by fluid treatment with air pressure or the like, so-called interlacing treatment is preferably minimized. Specifically, the fibers at the raw yarn stage have preferably a degree of entanglement of not less than 5/m and not more than 30/m. For the purpose of setting the degree of entanglement within the above range, it is preferable that interlacing treatment is performed after completion of the drawing treatment until the fibers are wound up, so that the degree of entanglement of the fibers are adjusted.

When the degree of entanglement is excessively low, fluff is apt to occur in the subsequent step, that is, a weaving step, so that quality deterioration may be found. On the other hand, when the degree of entanglement is excessively high, many entanglements remain even in the woven fabric state after weaving, which may therefore inhibit the movement of the single yarn fiber. Therefore, the degree of entanglement at the raw yarn stage is preferably within the above-mentioned range.

The method of weaving the airbag-use woven fabric is not particularly limited, and a conventionally known method may be used. For example, the warp tension upon weaving is preferably not less than 0.1 cN/dtex and not more than 0.5 cN/dtex. It is more preferably not less than 0.15 cN/dtex and not more than 0.4 cN/dtex, and even more preferably not less than 0.18 cN/dtex and not more than 0.35 cN/dtex. When the warp tension is lower than 0.1 cN/dtex, weave density adjustment is difficult, and the degree of entanglement of the warp is apt to be maintained, which may make it difficult to achieve good packing property between filaments as a woven fabric. When the warp tension is higher than 0.5 cN/dtex, a force applied to the warp is so large that fluff may be apt to occur.

The loom to be used for weaving is not particularly limited, and a waterjet loom, an airjet loom, a rapier loom, a multiphase weaving machine, or the like is preferably used. Of these, a waterjet loom is preferable from the viewpoint of higher speed, widening, or machine cost.

A processing method after weaving of the airbag-use woven fabric is not particularly limited. Therefore, as long as the above-mentioned characteristics of the present invention, that is, the characteristics in that the single yarn fibers move in the woven fabric under the influence of an external force can be maintained, any processing may be allowed. Examples of the processing method after weaving of the airbag-use woven fabric include scouring treatment, and heat treatment such as drying or heat setting. These may be performed alone or in combination of two or more methods.

As embodiments in combination of the processing methods after weaving of the woven fabric, specific examples include an embodiment in which the grey fabric woven with a waterjet loom is naturally dried, or subjected to heat treatment step for drying; an embodiment in which the grey fabric woven with various looms is subjected to scouring step, followed by heat treatment step for drying; an embodiment in which the grey fabric woven with various looms is subjected to scouring step, followed by heat treatment step for heat setting; and the like. The woven fabric in a state as woven with a loom, which is grey fabric, of course, may be cut without subjecting to the above processing steps, and then sewn to produce an airbag.

First, the embodiment in which the grey fabric woven with a waterjet loom is naturally dried, or subjected to heat treatment step for drying will be described (hereinafter referred to as the first embodiment in some cases). In the case the heat treatment step was performed at a specific temperature, the heat treatment temperature (drying temperature) of the grey fabric is set to not less than 20° C. and not more than 190° C. It is preferably not less than 40° C. and not more than 160° C., and more preferably not less than 60° C. and not more than 140° C. The heat treatment time (drying time) is preferably not less than 10 seconds and not more than 5 minutes. It is more preferably not less than 20 seconds and not more than 3 minutes, and even more preferably not less than 30 seconds and not more than 2 minutes. In the heat treatment step, the grey fabric may be subjected to heat treatment at the above-mentioned temperature, and the method is not particularly limited. Therefore, the device for performing the heat treatment step is not particularly limited, and examples thereof include a dryer (a dryer-type heating furnace), and a cylinder dryer using hot air, steam, or the like as heating medium. Any of them may be used as long as the device is used to dry the woven fabric. In the first embodiment, in place of the above-mentioned heat treatment, the woven grey fabric is naturally dried to complete an airbag-use woven fabric.

In the embodiment in which the grey fabric woven with various looms is subjected to scouring step, followed by heat treatment step for drying (hereinafter referred to as the second embodiment in some cases), after the weaving, the grey fabric is subjected to hot water treatment to pass through a water bath at a temperature of not less than 50° C. and not more than 100° C. (scouring treatment). In the heat treatment, an oiling agent, a sizing agent, or the like to be applied in the spinning step or the weaving step is removed from the woven fabric and the woven fabric is shrunk. When the temperature of water is less than 50° C., the woven fabric may be insufficiently shrunk. The temperature of water is more preferably not less than 60° C. and not more than 98° C., and even more preferably not less than 70° C. and not more than 95° C. The hot water treatment is performed preferably for not less than 10 seconds and not more than 3 minutes. It is performed more preferably for not less than 20 seconds and not more than 2 minutes, and even more preferably for not less than 30 seconds and not more than 1 minute. Examples of the water that may be used in the hot water treatment include tap water and pure water, and further include an aqueous solution dissolving one or more kinds selected from surfactant such as alkyl benzene sulfonate soda, alkali scouring agent such as soda ash, enzyme, organic solvents, and the like.

It is preferable that the hot water treatment is performed while a tension of not more than 0.040 cN/dtex is applied in the warp direction of the grey fabric. The woven fabric is sufficiently shrunk by the hot water treatment under the specified tension, so that the thread in the grey fabric can be rearranged. Further, in the case of using a polyamide fiber such as Nylon 66, a hydrogen bond in the fiber is easily cleaved in the presence of water, thereby easily obtaining more flexible basic fabric. When the tension in the warp direction exceeds 0.040 cN/dtex, the woven fabric is less freely shrunk upon the hot water treatment, and the woven fabric itself is nearly in a heat-set state in tension, so that the flexibility of the woven fabric may tend to be impaired.

Next, the woven fabric through the scouring step (hot water treatment) is subjected to heat treatment step. In the heat treatment step according to the second embodiment, the heat-set processing is not performed, but the woven fabric is preferably dried. From the same reason as for the hot water treatment, the tension in the warp direction at the heat treatment (drying) step is preferably not more than 0.040 cN/dtex.

The heat treatment temperature (drying temperature) is preferably not more than 150° C. from the viewpoint of securing the flexibility of the airbag-use woven fabric. It is more preferably not more than 140° C. Although lower drying temperature is preferable, excessively low drying temperature needs longer time, which is not industrially preferable. It is preferably not less than 100° C., and more preferably not less than 110° C. The heat treatment time is preferably not less than 10 seconds and not more than 5 minutes. It is more preferably not less than 20 seconds and not more than 3 minutes, and even more preferably not less than 30 seconds and not more than 2 minutes.

In the embodiment in which the grey fabric woven with various looms is subjected to scouring step, followed by heat treatment step for heat setting (hereinafter referred to as the third embodiment in some cases), water having a relatively low temperature, specifically, not less than 30° C. and not more than 90° C. is used. The temperature of water is preferably not less than 40° C. and not more than 80° C., and more preferably not less than 50° C. and not more than 70° C. When the temperature is within the above range, an oiling agent, a sizing agent, or the like to be applied in the spinning step or the weaving step can be effectively removed from the woven fabric.

There is no limitation for the scouring step as long as water having a specific temperature is used, and a conventionally known scouring method can be adopted. Examples of the water that may be used in the scouring step include tap water and pure water, and further include an aqueous solution dissolving one or more kinds selected from surfactant such as alkyl benzene sulfonate soda, alkali scouring agent such as soda ash, enzyme, organic solvents, and the like.

The scouring step may be performed while a tension is applied in the traveling direction of the grey fabric and the direction perpendicular to the traveling direction (width direction). For example, an overfeeding percentage in the traveling direction of the grey fabric is preferably not less than 0% and not more than 5%, more preferably not less than 1% and not more than 4%, and even more preferably not less than 2% and not more than 3%. On the other hand, the overfeeding percentage in the width direction of the grey fabric is preferably not less than 0% and not more than 3%, more preferably not less than 0.5% and not more than 2.5%, and even more preferably not less than 1% and not more than 2%.

The scouring treatment is performed preferably for not less than 10 seconds and not more than 5 minutes. It is performed more preferably for not less than 20 seconds and not more than 3 minutes, and even more preferably for not less than 30 seconds and not more than 2 minutes. The woven fabric (grey fabric) after the scouring treatment is once subjected to spin-drying or drying treatment, and thereafter, may be subjected to heat treatment step. However, since in the heat treatment step, the woven fabric is heated at not less than 110° C., the woven fabric after the scouring treatment may be directly subjected to heat treatment step without drying treatment or other treatment.

Subsequently, the woven fabric after the scouring treatment is subjected to heat treatment at not less than 110° C. and not more than 190° C. (heat treatment step). The heat treatment temperature is preferably not less than 120° C., more preferably not less than 130° C., and preferably not more than 185° C., more preferably not more than 180° C., and even more preferably not more than 175° C. When the heat treatment temperature is excessively low, a long period of time tends to be required for drying of the woven fabric wet by the scouring treatment. This is not only effective but also prevents the woven fabric has from fully exhibiting its original shrinkage force, so that a knot between fibers may become large, resulting in high air permeability. On the other hand, when the heat treatment temperature is excessively high, not only the fibers that constitute the woven fabric are thermally degraded, so that dynamic strength may become lower, but also heat shrinkage applies strong strain to the woven fabric, so that the woven fabric may be hardened, resulting in poor package ability.

In the third embodiment, heat treatment (heat setting) is performed while a tension is applied to the woven fabric. From the viewpoint of obtaining a woven fabric having low air permeability, it is preferable that the woven fabric (grey fabric) is subjected to heat treatment step so as to be overfed. The overfeeding percentage in the traveling direction of the woven fabric is not less than 1.5% and not more than 6.0%, preferably not less than 2.0% and not more than 5.0%, and more preferably not less than 2.5% and not more than 4.5%. On the other hand, the overfeeding percentage (tentering ratio) in the direction (width direction) perpendicular to the traveling direction of the woven fabric (grey fabric) is not less than 1.0% and not more than 4.0%, preferably not less than 1.5% and not more than 3.5%, and more preferably not less than 2.0% and not more than 3.0%.

When the grey fabric is supplied in an overfed state both in the scouring step and the heat treatment (heat setting) step, in the heat setting step, the overfeeding percentage in the traveling direction of the woven fabric is preferably not less than 0% and not more than 5.0%, more preferably not less than 1.0% and not more than 4.0%, and even more preferably not less than 1.5% and not more than 3.0%. On the other hand, the overfeeding percentage (tentering ratio) in the direction (width direction) perpendicular to the traveling direction of the woven fabric is preferably not less than 0% and not more than 3.0%, more preferably not less than 0.5% and not more than 2.5%, and even more preferably not less than 1.0% and not more than 2.0%.

Here, the overfeeding percentage in the traveling direction of the woven fabric is a value represented by the following formula. An overfed state can be obtained by setting speed ($V_1$) of a feed roller which is located on the upstream side of the heat treatment step and supplies the woven fabric to the heat treatment step higher than speed ($V_2$) of a winding roller which is located on the downstream side of the heat treatment step.

Overfeed percentage in traveling direction (%)=
($V_1/V_2$)×100

[$V_1$: Feed roller speed, $V_2$: Winding roller speed]

On the other hand, the overfeeding percentage in the direction (width) perpendicular to the traveling direction of the woven fabric is a value represented by the following formula. Usually, the heat treatment step is performed in a state where both widthwise ends of the woven fabric are fixed. The distance from one fixed end to the other fixed end is set narrower than the width of the woven fabric before supplied to the heat treatment step, so that an overfed state can be obtained.

Overfeed percentage in direction perpendicular to traveling direction of woven fabric (%)=
(1−$L_0/L_1$)×100

[$L_0$: Width of woven fabric before supplying to heat treatment step (m), $L_1$: Width of woven fabric after supplying to heat treatment step (m)]

When the overfeeding percentages in the traveling direction of the woven fabric and in the width direction are within the above ranges, it is preferable that the movement of the single yarn fiber at the time when the woven fabric undergoes an external force and spreading of the weaving yarn in a direction perpendicular to the fiber axis suitably occur. When the overfeeding percentage is excessively small, the yarn is shrunk by the heat treatment, so that an excessive tension is applied to the single yarn fiber itself as well. Therefore, even though the woven fabric undergoes an external force, the single yarn fiber less moves, and the weaving yarn less spreads in the direction perpendicular to the fiber axis, which may increase the air permeability. On the other hand, when the overfeeding percentage is excessively large, the shrinkage force of the fiber forms a larger crimp, so that a gap occurs between the fibers, which may deteriorate the air permeability, or so that the woven fabric becomes thicker, which may result in poor package ability, or an excessive tension is applied to the woven fabric, so that the woven fabric itself may become rigid.

Heat-setting may be performed using in combination of a known device and heating means. Examples of the device include a device for holding the woven fabric, called a pin tenter or a clip tenter. As the heating means, for example, a dryer-type heating furnace can be used.

An airbag can be obtained by cutting, sewing, or welding the above-mentioned airbag-use woven fabric into a desired shape.

The present application claims the priority benefits of Japan Patent Application Number 2015-76561 filed on Apr. 3, 2015, Japan Patent Application Number 2015-118278 filed on Jun. 11, 2015, and Japan Patent Application Number 2016-52275 filed on Mar. 16, 2016.

The entire contents of the specifications of Japan Patent Application Number 2015.76561 filed on Apr. 3, 2015, Japan Patent Application Number 2015-118278 filed on Jun. 11, 2015, and Japan Patent Application Number 2016-52275 filed on Mar. 16, 2016 are hereby incorporated by reference.

EXAMPLES

Hereinafter, the present invention is described in more detail by Examples, but the present invention is by no means limited to the following Examples. The present invention can be suitably modified in the range adaptable to the spirit described above and below, and any of the modifications are included in the technical scope of the present invention. Unless otherwise noted hereinbelow, "part" means "part by mass" and "%" means "% by mass".

(1) Total Fineness

Total fineness was measured in accordance with JIS L1095 9.4.1.

(2) Number of Single Yarn Filaments that Constitute Fiber

Number of single yarn filaments that constitute the fiber was calculated in accordance with JIS L1013 (1999) 8.4.

(3) Strength and Elongation

In accordance with the definition of the standard condition test of JIS L1017 8.5 a), strength and elongation were measured with a tensile testing machine ("TENSILON universal material testing instrument" manufactured by Orientec Co., Ltd.) after being allowed to stand for 24 hours in a chamber where temperature and humidity were controlled to 20° C. and 65% RH, respectively.

(4) Shrinkage in Boiling Water

Shrinkage in boiling water was measured by (a) skein shrinkage ratio (A method) described in JIS L1013 (1999) 8.18.1.

(5) Weave Density (Number of Stitches)

Weave density was measured in accordance with JIS L1096 (1999) 8.6.

(6) Cross-Sectional Shape and Modification Degree

Cross sections of five single yarn fibers optionally selected were shot (at a magnification of 1000 to 2000) using a scanning electron microscope. Using a commercially available software (e.g., NIS-Elements Documentation), in the resulting photographs of the cross sections of the single yarn fibers, three apexes (referred to as a, b, and c) of a substantially triangular shape appearing in the cross section of the single yarn fiber were visually selected, and a circle passing through these three apexes, a, b, and c and circumscribing the single yarn fiber cross section was depicted (circumscribed circle 31). Next, perpendicular bisectors 21 of line segments ab, bc, and ac that connect the above-mentioned apexes were drawn, and a circle passing through three intersection points 22 on the single yarn fiber cross section that intersects the perpendicular bisectors 21 and inscribing the single yarn fiber cross section was depicted (inscribed circle 32).

Then, the radius of the above circumscribed circle 31 divided by the radius of the inscribed circle 32 was determined as a modification degree (see, FIGS. 2 to 5). The modification degree employed the mean value of five filaments. The modification degree of the nozzle opening was calculated in the same manner as above.

In the case where the single yarn fiber has a shape other than a substantially triangular cross-sectional shape, a circumscribed circle and an inscribed circle that contact the outer edge of the single yarn fiber cross section were set and the modification degree was determined from the ratio of these radii. In the case where a plurality of inscribed circles were depicted in the fiber cross section, the radius of the minimum inscribed circle was used to determine the modification degree.

(7) Yarn Widening Ratio

As referred to FIG. 8, the method of measuring the yarn widening ratio will be described. Fibers (a multifilament) 61 were tied into a single loop having a perimeter of 20 cm. A 1 cm-diameter Teflon (registered trademark) rod 62 which was horizontally placed was passed through the loop to suspend fibers 61. At this time, the position of binding point 64 was adjusted so as not to come on Teflon (registered trademark) rod 62 and at the lowest point. A 1.52 times larger load 63 than the one relative to the total fineness (dtex) of the fibers was suspended at the lowest point on looped fiber 61. Load 63 is suspended on fibers 61 via a connecting yarn 67 using the fiber used for the measurement.

In such state, fibers width (a) of the multifilament located on the top of Teflon (registered trademark) rod 62 and fibers width (b) of the thickest fiber located 5 cm upward from the loading point (the lowest point of fibers 61) on the side where binding point 64 is absent were measured, and a ratio of them (a/b) was then calculated. Using a different fibers, the above measurement was repeated 10 times and the mean value was determined as a yarn widening ratio. The yarn widening ratio of unwoven weaving yarn from the woven fabric was also measured in the same manner as above.

(8) High-Pressure Air Permeability (Air Permeability Under a Pressure Difference of 20 kPa)

In five measurement portions randomly selected from a section excluding an area 30 cm from both widthwise ends of the woven fabric obtained in Examples and Comparative Examples, an air permeability under a pressure difference of 20 kPa was measured using a high-pressure air permeability measuring device (manufactured by OEM Systems), and the means value was determined as a high-pressure air permeability.

(9) High-Pressure Air Permeability after Folding (Air Permeability Under a Pressure Difference of 20 kPa)

Five 20 cm square specimens were cut out from an optional portion excluding a range of 30 cm from both widthwise ends of the woven fabric, and each cut specimen was folded in half along a fiber axial direction (a), then folded in half along a fiber axial direction (b) which was perpendicular to the fiber axial direction (a), again folded in half along the fiber axial direction (a), and folded in half along the fiber axial direction (b) which was perpendicular to the fiber axial direction (a), thereby obtaining a 5 cm square folded specimen. A load of 50 N was applied over the entire folded specimen for 1 minute, and the specimen was then unfolded into a 20 cm square shape and allowed to stand for 1 minute in the unfolded state. Then, as a measurement portion, a circle having a diameter of 10 cm which was centered on an intersection point of the first fold and the second fold, was measured for air permeability under a pressure difference of 20 kPa with a high-pressure air permeability measuring device (manufactured by OEM Systems). The mean value of five specimens was determined as the high-pressure air permeability after folding.

(10) Ratio of Change in Air Permeability

Ratio of change in the air permeability before and after folding was obtained by the following formula 2.

$$\text{Ratio of change in air permeability (\%)} = \text{(high-pressure air permeability after folding)}/\text{(high-pressure air permeability before folding)} \times 100 \quad \text{(Formula 2)}$$

(11) Thickness of Base Fabric

Thickness of the base fabric was measured in accordance with JIS L1096 (1999) 8.5 (under a pressure of 240 g/cm$^2$).

(12) Degree of Entanglement

Degrees of entanglement of the raw yarn and the unwoven weaving yarn were calculated in accordance with JIS L1013 8.15.

(13) ASTM Stiffness

Stiffness was measured in accordance with ASTM D 4032.

(14) ASTM Package Ability

Package ability was measured in accordance with ASTM D 6478.

(15) Tear Strength

Tear strength was measured in accordance with A-2 method (single tongue method) of JIS L1096 8.15.2. The median was employed as the result.

Example 1-1

As a fiber having a modified cross section, polyamide 66 resin was melt-extruded using a uniaxial extruder, the resulting resin was weighed using a gear pump, and the weighed resin was extruded into a nozzle (having a modification degree of 4) of which the opening was processed into a shape illustrated in FIG. 1, via a metal nonwoven filter (NF-07 manufactured by Nippon Seisen Co., Ltd.) to give a fibrous melt. Thereafter, the fibrous melt was directly passed through a heating cylinder immediately below the nozzle, cooled by cooling air, and then applied with a fatty acid ester-based spin finish oil. The fibrous melt thus applied was wound around a take-up roller, and drawn as is by a known method, so that a triangular cross-sectional polyamide 66 fiber having 350 dtex and 48 filaments was obtained. Properties of the fiber thus obtained are shown in Table 1.

As a fiber having a round cross section, polyamide 66 resin was melt-extruded using a uniaxial extruder, the resulting resin was weighed using a gear pump, and the weighed resin was extruded into a nozzle via a metal nonwoven filter (NF-07 manufactured by Nippon Seisen Co., Ltd.) to give a fibrous melt. Thereafter, the fibrous melt was directly passed through a heating cylinder immediately below the nozzle, cooled by cooling air, and then applied with a fatty acid ester-based spin finish oil. The fibrous melt thus applied was wound around a take-up roller, and drawn as is by a known method, so that a round cross-sectional polyamide 66 fiber having 350 dtex and 108 filaments was obtained.

Using the triangular cross-sectional yarn and the round cross-sectional yarn, both obtained above, as weft and warp, respectively, weaving was performed by a waterjet loom. After the weaving, the woven yarns were allowed to pass through a hot water bath at 98° C., the working tension was adjusted so that the traveling tension in the warp direction became 0.026 cN/dtex, and hot water treatment was then performed. Subsequently, drying treatment was performed under a traveling tension in the warp direction of 0.026 cN/dtex to give a plain-woven fabric having a weaving density for warp and weft directions of 59 yarns/inch. Properties of the woven fabric thus obtained are shown in Table 1.

Example 1-2

The same procedure as in Example 1-1 was performed, except that the number of nozzle openings was 108 and the number of filaments was 108 during spinning of the triangular cross sectional fiber, so that a triangular cross-sectional polyamide 66 fiber and a woven fabric were obtained. Properties of the woven fabric thus obtained are shown in Table 1.

Example 1-3

The same procedure as in Example 1-2 was performed, except that the modification degree of the nozzle was 6 and the modification degree of the filament was set higher during spinning of the triangular cross sectional fiber, so that a triangular cross-sectional polyamide 66 fiber and a woven fabric were obtained. Properties of the woven fabric thus obtained are shown in Table 1.

Example 1-4

The same procedure as in Example 1-2 was performed, except that the modification degree of the nozzle was 8 and the modification degree of the filament was set even higher during spinning of the triangular cross sectional fiber, so that a triangular cross-sectional polyamide 66 fiber and a woven fabric were obtained. Properties of the woven fabric thus obtained are shown in Table 1.

Example 1-5

The same procedure as in Example 1-3 was performed, except that the triangular cross-sectional fiber was also used in the warp during weaving, so that a woven fabric was obtained. Properties of the woven fabric thus obtained are shown in Table 1.

Example 1-6

The same procedure as in Example 1-5 was performed, except that the number of stitches of warp and weft was set higher during weaving, so that a woven fabric was obtained. Properties of the woven fabric thus obtained are shown in Table 1.

Example 1-7

The same procedure as in Example 1-5 was performed, except that the number of stitches of warp and weft was set lower during weaving, so that a woven fabric was obtained. Properties of the woven fabric thus obtained are shown in Table 1.

Comparative Example 1-1

Polyamide 66 resin was melt-extruded using a uniaxial extruder, the resulting resin was weighed using a gear pump, and the weighed resin was extruded into a nozzle via a metal nonwoven filter (NF-07 manufactured by Nippon Seisen Co., Ltd.) to give a fibrous melt. Thereafter, the fibrous melt was directly passed through a heating cylinder immediately below the nozzle, cooled by cooling air, and then applied with a fatty acid ester-based spin finish oil. The fibrous melt thus applied was wound around a take-up roller, and drawn as is by a known method, so that a round cross-sectional polyamide 66 fiber having 350 dtex and 48 filaments was obtained. Properties of the fiber thus obtained are shown in Table 2.

Polyamide 66 resin was melt-extruded using a uniaxial extruder, the resulting resin was weighed using a gear pump, and the weighed resin was extruded into a nozzle via a metal nonwoven filter (NF-07 manufactured by Nippon Seisen Co., Ltd.) to give a fibrous melt. Thereafter, the fibrous melt was directly passed through a heating cylinder immediately below the nozzle, cooled by cooling air, and then applied with a fatty acid ester-based spin finish oil. The fibrous melt thus applied was wound around a take-up roller, and drawn as is by a known method, so that a round cross-sectional polyamide 66 fiber having 350 dtex and 108 filaments was obtained.

Using the polyamide 66 fiber thus obtained, weaving was performed by a waterjet loom. Thereafter, the woven yarns were allowed to pass through a hot water bath at 98° C., the working tension was adjusted so that the traveling tension in the warp direction became 0.026 cN/dtex, and hot water treatment was then performed. Subsequently, drying treatment was performed under a traveling tension of 0.026 cN/dtex to give a plain-woven fabric having a weaving density for warp and weft directions of 59 yarns/inch. Properties of the woven fabric thus obtained are shown in Table 2.

Comparative Example 1-2

Polyamide 66 resin was melt-extruded using a uniaxial extruder, the resulting resin was weighed using a gear pump, and the weighed resin was extruded into a nozzle via a metal nonwoven filter (NF-07 manufactured by Nippon Seisen Co., Ltd.) to give a fibrous melt. Thereafter, the fibrous melt was directly passed through a heating cylinder immediately below the nozzle, cooled by cooling air, and then applied with a fatty acid ester-based spin finish oil. The fibrous melt thus applied was wound around a take-up roller, and drawn as is by a known method, so that a round cross-sectional polyamide 66 fiber having 350 dtex and 108 filaments was obtained.

Using the polyamide 66 fiber thus obtained, weaving was performed by a waterjet loom. Thereafter, the woven yarns were allowed to pass through a hot water bath at 98° C., the working tension was adjusted so that the traveling tension in the warp direction became 0.026 cN/dtex, and hot water treatment was then performed. Subsequently, drying treatment was performed under a traveling tension of 0.026 cN/dtex to give a plain-woven fabric having a weaving density for warp and weft directions of 59 yarns/inch. Properties of the woven fabric thus obtained are shown in Table 2.

Comparative Example 1-3

The same procedure as in Example 1-1 was performed, except that the modification degrees of the nozzle and the filament was 12 and 2.3, respectively, and a part of the triangular shape formed by connecting the apexes on the single yarn fiber cross section was set to be outside of the fiber cross section. Properties of the fibers and woven fabric thus obtained are shown in Table 2. The fiber thus obtained had a low yarn widening ratio at the time of application of lateral pressure and the woven fabric had high air permeability.

Comparative Example 1-4

The same procedure as in Example 1-5 was performed, except that the air pressure in the entanglement treatment was set higher and the raw material had a degree of entanglement of 35/m. Properties of the fibers and woven fabric thus obtained are shown in Table 2. The fiber thus obtained had a low yarn widening ratio at the time of application of lateral pressure and the woven fabric had high air permeability.

Comparative Example 1-5

The same procedure as in Comparative Example 1-3 was performed, except that the opening shape of the nozzle to be used is formed into a slit-like shape and the filament cross section had a flat shape. Properties of the fibers and woven fabric thus obtained are shown in Table 2. The woven fabric thus obtained had a low air permeability but higher air permeability after folding.

TABLE 1

| | | | Examples | | | | | | |
|---|---|---|---|---|---|---|---|---|---|
| | | Unit | 1-1 | 1-2 | 1-3 | 1-4 | 1-5 | 1-6 | 1-7 |
| Properties of warp raw yarn | Total fineness | dtex | 350 | 350 | 350 | 350 | 350 | 350 | 350 |
| | Single yarn fineness | dtex | 3.2 | 3.2 | 3.2 | 3.2 | 3.2 | 3.2 | 3.2 |
| | Modification degree of spinning nozzle | — | — | — | — | — | 6.0 | 6.0 | 6.0 |
| | No. of filaments | Filament(s) | 108 | 108 | 108 | 108 | 108 | 108 | 108 |
| | Strength | cN/dtex | 8.7 | 8.7 | 8.7 | 8.7 | 7.4 | 7.4 | 7.4 |
| | Elongation | % | 20.4 | 20.4 | 20.4 | 20.4 | 15.9 | 15.9 | 15.9 |
| | Shrinkage in boiling water | % | 9.2 | 9.2 | 9.2 | 9.2 | 9.6 | 9.6 | 9.6 |
| | Cross-sectional shape | — | Round | Round | Round | Round | Triangular shape | Triangular shape | Triangular shape |
| | Modification degree | — | 1 | 1 | 1 | 1 | 1.55 | 1.55 | 1.55 |
| | Regular triangular shape position | — | — | — | — | — | Inside | Inside | Inside |
| | Degree of entanglement | No. of entanglement/m | 20 | 20 | 20 | 20 | 19 | 19 | 19 |
| | Yarn widening ratio | — | 1.67 | 1.67 | 1.67 | 1.67 | 2.5 | 2.5 | 2.5 |
| Properties of weft raw yarn | Total fineness | dtex | 350 | 350 | 350 | 350 | 350 | 350 | 350 |
| | Single yarn fineness | dtex | 7.3 | 3.2 | 3.2 | 3.2 | 3.2 | 3.2 | 3.2 |
| | Modification degree of spinning nozzle | — | 4 | 4 | 6 | 8 | 6 | 6 | 6 |
| | No. of filaments | Filament(s) | 48 | 108 | 108 | 108 | 108 | 108 | 108 |
| | Strength | cN/dtex | 8.3 | 8.3 | 8.1 | 8.1 | 7.4 | 7.4 | 7.4 |
| | Elongation | % | 24.6 | 24.6 | 18.3 | 18.3 | 15.9 | 15.9 | 15.9 |
| | Shrinkage in boiling water | % | 8.6 | 9.8 | 9.6 | 9.6 | 9.6 | 9.6 | 9.6 |
| | Cross-sectional shape | — | Triangular shape | Triangular shape | Triangular shape | Triangular shape | Triangular shape | Triangular shape | Triangular shape |
| | Modification degree | — | 1.3 | 1.5 | 1.6 | 1.7 | 1.55 | 1.55 | 1.55 |
| | Regular triangular shape position | — | Inside | Inside | Inside | Inside | Inside | Inside | Inside |
| | Degree of entanglement | No. of entanglement/m | 18 | 19 | 19 | 20 | 19 | 19 | 19 |
| | Yarn widening ratio | — | 2.0 | 2.2 | 2.4 | 2.6 | 2.5 | 2.5 | 2.5 |
| Properties of woven fabric | No. of stitches (warp/weft) | Filament(s)/2.5 cm | 59/59 | 59/59 | 59/59 | 59/59 | 59/59 | 62/62 | 57/55 |
| | Cover factor | — | 2094 | 2094 | 2094 | 2094 | 2094 | 2201 | 1988 |
| | High-pressure air permeability | L/cm²/min | 0.59 | 0.55 | 0.50 | 0.38 | 0.40 | 0.35 | 0.68 |
| | High-pressure air permeability after folding | L/cm²/min | 0.60 | 0.56 | 0.52 | 0.38 | 0.41 | 0.36 | 0.68 |
| | Thickness of base fabric | mm | 0.25 | 0.25 | 0.25 | 0.25 | 0.24 | 0.26 | 0.23 |
| | Degree of entanglement of unwoven weaving yarn (warp) | No. of entanglement/m | 15 | 15 | 14 | 14 | 14 | 14 | 15 |
| | Degree of entanglement of unwoven weaving yarn (weft) | No. of entanglement/m | 13 | 14 | 14 | 15 | 14 | 14 | 15 |
| | Yarn widening ratio of unwoven weaving yarn (warp) | — | 2.3 | 2.3 | 2.3 | 2.3 | 3.4 | 3.4 | 3.4 |
| | Yarn widening ratio of unwoven weaving yarn (weft) | — | 2.9 | 3.0 | 3.3 | 3.5 | 3.4 | 3.4 | 3.4 |

TABLE 2

|  |  | Unit | Comparative examples | | | | |
|---|---|---|---|---|---|---|---|
|  |  |  | 1-1 | 1-2 | 1-3 | 1-4 | 1-5 |
| Properties of warp raw yarn | Total fineness | dtex | 350 | 350 | 350 | 350 | 350 |
|  | Single yarn fineness | dtex | 3.2 | 3.2 | 3.2 | 3.2 | 3.2 |
|  | Modification degree of spinning nozzle | — | — | — | — | 6.0 | 6.0 |
|  | No. of filaments | Filament(s) | 108 | 108 | 108 | 108 | 108 |
|  | Strength | cN/dtex | 8.7 | 8.7 | 8.7 | 7.4 | 7.2 |
|  | Elongation | % | 20.4 | 20.4 | 20.4 | 15.9 | 14.8 |
|  | Shrinkage in boiling water | % | 9.2 | 9.2 | 9.2 | 9.2 | 9.2 |
|  | Cross-sectional shape | — | Round | Round | Round | Triangular shape | Flat |
|  | Modification degree | — | 1 | 1 | 1 | 1.6 | 2.8 |
|  | Regular triangular shape position | — | — | — | — | Inside | — |
|  | Degree of entanglement | No. of entanglement/m | 20 | 20 | 20 | 35 | 18 |
|  | Yarn widening ratio | — | 1.67 | 1.67 | 1.67 | 1.35 | 1.41 |
| Properties of weft raw yarn | Total fineness | dtex | 350 | 350 | 350 | 350 | 350 |
|  | Single yarn fineness | dtes | 7.3 | 3.2 | 7.3 | 3.2 | 3.2 |
|  | Modification degree of spinning nozzle | — | — | — | 12 | 6 | 6 |
|  | No. of filaments | Filament(s) | 48 | 108 | 48 | 108 | 108 |
|  | Strength | cN/dtex | 7.9 | 8.7 | 6.3 | 7.4 | 7.2 |
|  | Elongation | % | 19.7 | 20.4 | 17.7 | 15.9 | 14.8 |
|  | Shrinkage in boiling water | % | 9.2 | 9.2 | 9.2 | 5.7 | 9.2 |
|  | Cross-sectional shape | — | Round | Round | Y | Triangular shape | Flat |
|  | Modification degree | — | 1 | 1 | 2.3 | 1.55 | 2.8 |
|  | Regular triangular shape position | — | — | — | Outside | Inside | — |
|  | Degree of entanglement | No. of entanglement/m | 18 | 20 | 18 | 35 | 18 |
|  | Yarn widening ratio | — | 1.5 | 1.67 | 1.7 | 1.35 | 1.4 |
| Properties of woven fabric | No. of stitches (warp/weft) | Filament(s)/2.5 cm | 59/59 | 59/59 | 59/59 | 59/59 | 59/59 |
|  | Cover factor | — | 2094 | 2094 | 2094 | 2094 | 2094 |
|  | High-pressure air permeability | L/cm$^2$/min | 1.33 | 0.74 | 0.78 | 0.73 | 0.35 |
|  | High-pressure air permeability after folding | L/cm$^2$/min | 1.35 | 0.75 | 0.79 | 0.74 | 0.71 |
|  | Thickness of base fabric | mm | 0.26 | 0.26 | 0.26 | 0.25 | 0.25 |
|  | Degree of entanglement of unwoven weaving yarn (warp) | No. of entanglement/m | 15 | 15 | 14 | 30 | 14 |
|  | Degree of entanglement of unwoven weaving yarn (weft) | No. of entanglement/m | 15 | 15 | 14 | 32 | 14 |
|  | Yarn widening ratio of unwoven weaving yarn (warp) | — | 2.3 | 2.3 | 2.3 | 1.4 | 1.4 |
|  | Yarn widening ratio of unwoven weaving yarn (weft) | — | 2.3 | 2.3 | 3.6 | 1.4 | 1.4 |

According to the present invention, it is possible to provide an airbag-use woven fabric which is excellent in low air permeability and excellent in lightweight property and compactness. The airbag-use woven fabric of the present invention has low air permeability and is excellent in lightweight and compactness. Accordingly, it is suitable particularly for a driver seat and a passenger seat.

Example 2-1

Polyamide 66 resin was melt-extruded using a uniaxial extruder, the resulting resin was weighed using a gear pump, and the weighed resin was extruded into a nozzle (having a modification degree of 6) of which the opening was processed into a shape illustrated in FIG. 1, via a metal nonwoven filter (NF-07 manufactured by Nippon Seisen Co., Ltd.) to give a fibrous melt. Thereafter, the fibrous melt was directly passed through a heating cylinder immediately below the nozzle, cooled by cooling air, and then applied with a fatty acid ester-based spin finish oil. The fibrous melt thus applied was wound around a take-up roller, and drawn as is by a known method, so that a substantially triangular cross-sectional polyamide 66 fiber (substantially triangular cross-sectional yarn) having 350 dtex and 108 filaments was obtained. A scanning electron microscope photograph of the fiber cross section is shown in FIG. 6.

Using the substantially triangular cross-sectional yarn thus obtained as weft and warp, weaving was performed by a waterjet loom. After the weaving, the woven yarns were allowed to pass through a hot water bath at 98° C., the working tension was adjusted so that the traveling tension in the warp direction became 0.026 cN/dtex, and hot water treatment was then performed. Subsequently, drying treatment was performed under a traveling tension in the warp direction of 0.026 cN/dtex to give a plain-woven fabric having a weaving density for warp and weft directions of 59 yarns/inch. Properties of the raw yarn and woven fabric are shown in Table 3.

Example 2-2

The same procedure as in Example 2-1 was performed, except that the nozzle having a modification degree of 4 was used during spinning, to thereby produce a fiber having a modified cross section, and the fiber was then woven to give a woven fabric. Properties of the raw yarn and woven fabric are shown in Table 3.

Example 2-3

The same procedure as in Example 2-1 was performed, except that the nozzle having a modification degree of 8 was used during spinning, to thereby produce a fiber having a modified cross section, and the fiber was then woven to give a woven fabric. Properties of the raw yarn and woven fabric are shown in Table 3.

Example 2-4

The same procedure as in Example 2-1 was performed, except that the nozzle having a modification degree of 10 was used during spinning, to thereby produce a fiber having a modified cross section, and the fiber was then woven to give a woven fabric. Properties of the raw yarn and woven fabric are shown in Table 3.

Example 2-5

The same procedure as in Example 2-1 was performed, except that the nozzle having a modification degree of 6 was used during spinning, so that a triangular cross-sectional polyamide 66 fiber having 470 dtex and 72 filaments was obtained.

Using the triangular cross-sectional yarn thus obtained as weft and warp, weaving was performed by a waterjet loom. After the weaving, the woven yarns were allowed to pass through a hot water bath at 98° C., the working tension was adjusted so that the traveling tension in the warp direction became 0.026 cN/dtex, and hot water treatment was then performed. Subsequently, drying treatment was performed under a traveling tension of 0.026 cN/dtex to give a plain-woven fabric having a weaving density for warp and weft directions of 54 yarns/inch. Properties of the raw yarn and woven fabric are shown in Table 3.

Comparative Example 2-1

Polyamide 66 resin was melt-extruded using a uniaxial extruder, the resulting resin was weighed using a gear pump, and the weighed resin was extruded into a nozzle (having a modification degree of 1.0) via a metal nonwoven filter (NF-07 manufactured by Nippon Seisen Co., Ltd.) to give a fibrous melt. Thereafter, the fibrous melt was directly passed through a heating cylinder immediately below the nozzle, cooled by cooling air, and then applied with a fatty acid ester-based spin finish oil. The fibrous melt thus applied was wound around a take-up roller, and drawn as is by a known method, so that a round cross-sectional polyamide 66 fiber having 350 dtex and 108 filaments was obtained.

Using the polyamide 66 fiber thus obtained as weft and warp, weaving was performed by a waterjet loom. After the weaving, the woven yarns passed through a hot water bath at 98° C., the working tension was adjusted so that the traveling tension in the warp direction became 0.026 cN/dtex, and hot water treatment was then performed. Subsequently, drying treatment was performed under a traveling tension of 0.026 cN/dtex to give a plain-woven fabric having a weaving density for warp and weft directions of 59 yarns/inch. Properties of the raw yarn and woven fabric are shown in Table 3.

When compared with the woven fabrics of Examples made of the fibers in which the single yarn fiber had a substantially triangular cross-sectional shape, the woven fabric obtained in Comparative Example 2.1 had a higher high-pressure air permeability.

Comparative Example 2-2

According to the procedure in Comparative Example 2-1, a round cross-sectional polyamide 66 fiber having 470 dtex and 72 filaments was produced, and the fiber was then woven to give a plain-woven fabric having a weaving density for warp and weft directions of 54 yarns/inch. Properties of the raw yarn and woven fabric are shown in Table 3. It is considered that the fibers that constitute the woven fabric obtained in Comparative Example 2-2 had the same total fineness as that in Example 2-5, but the package ability of the woven fabric was decreased because the single yarn fiber had a rounded cross section, so that its movement in the fiber was less effective, and because the woven fabric was thick and rigid. The woven fabric of Comparative Example 2-2 also had a high high-pressure air permeability.

Comparative Example 2-3

The same procedure as in Comparative Example 2-1 was performed, except that the nozzle having a modification degree of 12.0 was used during spinning, and the single fiber cross section was formed into Y shape by a known method, to thereby produce a Y-shaped cross-sectional polyamide 66 fiber, and the fiber was then woven to give a woven fabric. Properties of the raw yarn and woven fabric are shown in Table 3. A scanning electron microscope photograph of the fiber cross section obtained in Comparative Example 2-3 is shown in FIG. 7.

When compared with the woven fabric of Examples that had the same total fineness and number of filaments, and was made of the triangular cross-sectional fibers, the woven fabric of Comparative Example 2-3 using the Y-shaped cross-sectional fiber had a thicker basic fabric and poorer package ability. The woven fabric of Comparative Example 2-3 also had a higher high-pressure air permeability as compared with the woven fabric of Examples.

Comparative Example 2-4

The same procedure as in Comparative Example 2-1 was performed, except that the opening shape of the nozzle to be used had was changed and the cross-sectional shape of the single yarn fiber was formed into a square shape by a known method, to thereby produce a fiber, and the fiber was then woven to give a woven fabric. Properties of the raw yarn and woven fabric are shown in Table 3.

When compared with the woven fabric of Examples that had the same total fineness and number of filaments, and was made of the triangular cross-sectional fibers, the woven fabric of Comparative Example 2-4 using the square-shaped cross-sectional fiber was thicker and had poorer package ability.

Comparative Example 2-5

The same procedure as in Comparative Example 2-1 was performed, except that the opening shape of the nozzle to be used is formed into a slit-like shape and the cross section perpendicular to the fiber axial direction was formed into a flat shape by a known method, to thereby produce a fiber, and the fiber was then woven to give a woven fabric. Properties of the raw yarn and woven fabric are shown in Table 3.

When compared with the woven fabric of Examples made of the triangular cross-sectional fibers, the woven fabric of Comparative Example 2.5 had a higher high-pressure air permeability after folding. This is considered that when the woven fabric was folded, the laminated structure of the single yarn fiber having a flat cross section was disturbed.

Comparative Example 2-6

According to the procedure in Comparative Example 2-1, a substantially triangular cross-sectional fiber was produced, and the fiber was then woven to give a woven fabric. After the weaving, the grey fabric was allowed to pass through a hot water bath at 55° C. for 1 minute. Thereafter, drying was performed at 120° C. for 1 minute (scouring treatment C). Next, using a pin tenter, the woven fabric was subjected to heat treatment (heat shrinkage treatment (heat setting)) at 180° C. for 30 seconds under conditions of an overfeeding percentage in a woven fabric traveling direction of 4.0% and a tentering ratio of 2.5%. Subsequently, the woven fabric was processed by press-compressing one surface thereof at a line pressure of 170 kg/cm and a rate of 10 m/min between a metal roll having a flat surface heated at 150° C. and a plastic roll at room temperature. Properties of the raw yarn and woven fabric are shown in Table 3.

The woven fabric of Comparative Example 2-6 had less tear strength than the woven fabric obtained in Example 2-1 having the same total fineness and cover factor as that of Comparative Example 2-6. This is considered because the warp and weft were meshed with each other by pressing the woven fabric, and a load was concentrated on the engaging portion between them, so that the tear strength was reduced. The woven fabric of Comparative Example 2-6 also had smaller ratio of change in air permeability than that of Examples. This is considered because the fibers were compressed hard by calendar processing, so that the widening ratio became low.

TABLE 3

|  |  | Unit | Examples | | | | |
| --- | --- | --- | --- | --- | --- | --- | --- |
|  |  |  | 2-1 | 2-2 | 2-3 | 2-4 | 2-5 |
| Properties of raw yarn | Total fineness | dtex | 350 | 350 | 350 | 350 | 470 |
|  | No. of filaments | Filament(s) | 108 | 108 | 108 | 108 | 72 |
|  | Single yarn fineness | dtex | 3.2 | 3.2 | 3.2 | 3.2 | 6.5 |
|  | Modification degree of spinning nozzle | — | 6.0 | 4.0 | 8.0 | 10.0 | 6.0 |
|  | Strength | cN/dtex | 7.9 | 8.1 | 7.3 | 7.2 | 7.7 |
|  | Elongation | % | 17.3 | 17.9 | 15.6 | 15.3 | 19.5 |
|  | Shrinkage in boiling water | % | 9.6 | 9.8 | 9.5 | 9.2 | 9.3 |
|  | Cross-sectional shape | — | Triangular shape | Triangular shape | Triangular shape | Triangular shape | Triangular shape |
|  | Modification degree | — | 1.55 | 1.4 | 1.8 | 2.1 | 1.65 |
|  | Regular triangular shape position | — | Inside | Inside | Inside | Inside | Inside |
|  | Degree of entanglement | No. of entanglement/m | 19 | 22 | 18 | 21 | 20 |
|  | Yarn widening ratio | — | 2.5 | 2.4 | 2.4 | 2.2 | 2.1 |
| Properties of woven fabric | No. of stitches (warp/weft) | Filament(s)/2.5 cm | 59/59 | 59/59 | 59/59 | 59/59 | 54/54 |
|  | Cover factor | — | 2094 | 2094 | 2094 | 2094 | 2221 |
|  | Thickness of base fabric | mm | 0.24 | 0.24 | 0.24 | 0.24 | 0.29 |
|  | ASTM stiffness (warp/weft) | N | 8/9 | 8/10 | 9/9 | 9/9 | 19/20 |
|  | ASTM package ability (warp/weft) | cm$^3$ | 1450 | 1465 | 1470 | 1480 | 2300 |
|  | Tear strength (warp/weft) | N | 139/141 | 141/144 | 136/139 | 132/133 | 220/238 |
|  | High-pressure air permeability | L/cm$^2$/min | 0.40 | 0.42 | 0.37 | 0.45 | 0.53 |
|  | High-pressure air permeability after folding | L/cm$^2$/min | 0.41 | 0.43 | 0.39 | 0.47 | 0.55 |
|  | Ratio of change in air permeability | % | 103 | 102 | 105 | 104 | 104 |
|  | Yarn widening ratio of unwoven weaving yarn (warp) | — | 3.4 | 3.0 | 2.9 | 2.5 | 2.8 |
|  | Yarn widening ratio of unwoven weaving yarn (weft) | — | 3.4 | 3.0 | 2.9 | 2.5 | 2.8 |

TABLE 3-continued

|  | | Unit | Comparative Examples | | | | | |
|---|---|---|---|---|---|---|---|---|
|  | | | 2-1 | 2-2 | 2-3 | 2-4 | 2-5 | 2-6 |
| Properties of raw yarn | Total fineness | dtex | 350 | 470 | 350 | 350 | 350 | 350 |
| | No. of filaments | Filament(s) | 108 | 72 | 108 | 108 | 108 | 108 |
| | Single yarn fineness | dtex | 3.2 | 6.5 | 3.2 | 3.2 | 3.2 | 3.2 |
| | Modification degree of spinning nozzle | — | — | 1.0 | 1.0 | 12.0 | 2.0 | 6.0 | 6.0 |
| | Strength | cN/dtex | 8.7 | 8.5 | 7.1 | 7.8 | 7.4 | 7.9 |
| | Elongation | % | 20.4 | 22 | 14.9 | 17.1 | 16.5 | 17.3 |
| | Shrinkage in boiling water | % | 9.2 | 9.3 | 9.5 | 9.3 | 9.4 | 9.6 |
| | Cross-sectional shape | — | Round | Round | Y | Square | Flat | Triangular shape |
| | Modification degree | | 1 | 1 | 2.4 | 1.25 | 2.8 | 1.55 |
| | Regular triangular shape position | — | — | — | Outside | — | — | Inside |
| | Degree of entanglement | No. of entanglement/m | 20 | 20 | 20 | 20 | 20 | 19 |
| | Yarn widening ratio | — | 1.67 | 1.5 | 1.8 | 1.8 | 1.4 | 2.5 |
| Properties of woven fabric | No. of stitches (warp/weft) | Filament(s)/2.5 cm | 59/59 | 54/54 | 59/59 | 59/59 | 59/59 | 59/59 |
| | Cover factor | — | 2094 | 2221 | 2094 | 2094 | 2094 | 2094 |
| | Thickness of base fabric | mm | 0.26 | 0.32 | 0.25 | 0.25 | 0.25 | 0.23 |
| | ASTM stiffness (warp/weft) | N | 11/11 | 23/23 | 10/11 | 11/11 | 9/10 | 12/12 |
| | ASTM package ability (warp/weft) | cm$^3$ | 1570 | 2450 | 1550 | 1550 | 1500 | 1430 |
| | Tear strength (warp/weft) | N | 148/156 | 230/250 | 133/139 | 145/150 | 130/135 | 96/101 |
| | High-pressure air permeability | L/cm$^2$/min | 0.74 | 0.81 | 0.66 | 0.66 | 0.35 | 0.34 |
| | High-pressure air permeability after folding | L/cm$^2$/min | 0.76 | 0.83 | 0.68 | 0.67 | 0.71 | 0.72 |
| | Ratio of change in air permeability | % | 103 | 102 | 103 | 102 | 203 | 212 |
| | Yarn widening ratio of unwoven weaving yarn (warp) | — | 2.3 | 2.1 | 2.2 | 2.1 | 1.4 | 1.5 |
| | Yarn widening ratio of unwoven weaving yarn (weft) | — | 2.3 | 2.1 | 2.2 | 2.1 | 1.4 | 1.5 |

Example 2-6

The nozzle having a modification degree of 6.0 was used during spinning, and a triangular cross-sectional polyamide 66 fiber having 350 dtex, 108 filaments, and a shrinkage in boiling water of 5.5% was obtained in the same manner as in Example 2-1.

Using the substantially triangular cross-sectional yarn thus obtained as weft and warp, weaving was performed by a waterjet loom. After the weaving, using an open soaper type scouring machine, scouring treatment was performed by immersing the woven fabric thus obtained in a scouring bath (at a temperature of 65° C.) filled with an aqueous solution containing 0.5 g/L of alkyl benzene sulfonate soda and 0.5 g/L of soda ash for 1 minute. Thereafter, the woven fabric was washed with water in a hot water bath at 40° C. for 1 minute, and then dried at 130° C. for 1 minute (scouring treatment B). Next, using a pin tenter, the woven fabric was subjected to heat treatment (heat shrinkage treatment (heat setting)) at 180° C. for 1 minute under conditions of an overfeeding percentage in a woven fabric traveling direction of 2.5% and a tentering ratio of 1.5%, to give a plain-woven fabric having a weaving density for warp and weft directions of 59 yarns/inch. Properties of the raw yarn and woven fabric are shown in Table 4.

Example 2-7

The nozzle having a modification degree of 6.0 was used during spinning, and a triangular cross-sectional polyamide 66 fiber having 350 dtex, 108 filaments, and a shrinkage in boiling water of 9.6% was obtained in the same manner as in Example 2-1.

Using the substantially triangular cross-sectional yarn thus obtained as weft and warp, weaving was performed by a waterjet loom. After the weaving, the grey fabric was allowed to pass through a hot water bath at 55° C. for 1 minute. Thereafter, drying was performed at 120° C. for 1 minute (scouring treatment C). Next, using a pin tenter, the woven fabric was subjected to heat treatment (heat shrinkage treatment (heat setting)) at 160° C. for 1 minute under conditions of an overfeeding percentage in a woven fabric traveling direction of 4.5% and a tentering ratio of 3.0%. The woven fabric thus obtained was plain and had a weaving density for warp and weft directions of 59 yarns/inch. Properties of the raw yarn and woven fabric are shown in Table 4.

Example 2-8

The nozzle having a modification degree of 4.0 was used during spinning, and a triangular cross-sectional polyamide 66 fiber having 350 dtex, 108 filaments, and a shrinkage in boiling water of 9.8% was obtained in the same manner as in Example 2-2.

Using the substantially triangular cross-sectional yarn thus obtained as weft and warp, weaving was performed by a waterjet loom. After the weaving, the grey fabric was scoured, dried, and subjected to heat shrinkage treatment (heat setting) under the same conditions as in Example 2-7. The woven fabric thus obtained was plain and had a weaving density for warp and weft directions of 59 yarns/inch. Properties of the raw yarn and woven fabric are shown in Table 4.

Example 2-9

The nozzle having a modification degree of 8.0 was used during spinning, and a triangular cross-sectional polyamide 66 fiber having 350 dtex, 108 filaments, and a shrinkage in boiling water of 9.5% was obtained in the same manner as in Example 2-3.

Using the substantially triangular cross-sectional yarn thus obtained as weft and warp, weaving was performed by a waterjet loom. After the weaving, the grey fabric was scoured, dried, and subjected to heat shrinkage treatment (heat setting) under the same conditions as in Example 2-7. The woven fabric thus obtained was plain and had a weaving density for warp and weft directions of 59 yarns/inch. Properties of the raw yarn and woven fabric are shown in Table 4.

Example 2-10

The nozzle having a modification degree of 10.0 was used during spinning, and a triangular cross-sectional polyamide 66 fiber having 350 dtex, 108 filaments, and a shrinkage in boiling water of 9.2% was obtained in the same manner as in Example 2-4.

Using the substantially triangular cross-sectional yarn thus obtained as weft and warp, weaving was performed by a waterjet loom. After the weaving, the grey fabric was scoured, dried, and subjected to heat shrinkage treatment (heat setting) under the same conditions as in Example 2-7. The woven fabric thus obtained was plain and had a weaving density for warp and weft directions of 59 yarns/inch. Properties of the raw yarn and woven fabric are shown in Table 4.

Example 2-11

The nozzle having a modification degree of 6.0 was used during spinning, and a triangular cross-sectional polyamide 66 fiber having 350 dtex, 108 filaments, and a shrinkage in boiling water of 9.6% was obtained in the same manner as in Example 2-1.

Using the substantially triangular cross-sectional yarn thus obtained as weft and warp, weaving was performed by a waterjet loom. After the weaving, the grey fabric was not subjected to any particular processing, and naturally dried as is to thereby finish a woven fabric. The woven fabric thus obtained was plain and had a weaving density for warp and weft directions of 57 yarns/inch. Properties of the raw yarn and woven fabric are shown in Table 4.

Example 2-12

The nozzle having a modification degree of 6.0 was used during spinning, and a triangular cross-sectional polyamide 66 fiber having 470 dtex, 72 filaments, and a shrinkage in boiling water of 6.2% was obtained in the same manner as in Example 2-1.

Using the substantially triangular cross-sectional yarn thus obtained as weft and warp, weaving was performed by a waterjet loom. After the weaving, using an open soaper type scouring machine, scouring treatment was performed by immersing the woven fabric thus obtained in a scouring bath (at a temperature of 65° C.) filled with an aqueous solution containing 0.5 g/L of alkyl benzene sulfonate soda and 0.5 g/L of soda ash for 1 minute. Thereafter, the woven fabric was washed with water in a hot water bath at 45° C. for 1 minute, and subsequently dried at 140° C. for 1 minute (scouring treatment D).

Next, using a pin tenter, the woven fabric was subjected to heat shrinkage treatment (heat setting) at 180° C. for 1 minute under conditions of an overfeeding percentage in a woven fabric traveling direction of 3.0% and a tentering ratio of 2.0%. The woven fabric was plain and had a weaving density for warp and weft directions of 54 yarns/inch. Properties of the raw yarn and woven fabric are shown in Table 4.

Example 2-13

The same method as in Example 2-1 was performed, except that the nozzle having a modification degree of 6.0 was used during spinning, to thereby give a triangular cross-sectional polyamide 66 fiber having 470 dtex, 72 filaments, and a shrinkage in boiling water of 9.3%

Using the substantially triangular cross-sectional yarn thus obtained as weft and warp, weaving was performed by a waterjet loom. The grey fabric thus obtained was allowed to pass through a hot water bath at 60° C. for 1 minute to be scoured. Thereafter, drying was performed at 130° C. for 1 minute (scouring treatment E).

Next, using a pin tenter, the woven fabric was subjected to heat shrinkage treatment (heat setting) at 160° C. for 1 minute under conditions of an overfeeding percentage in a woven fabric traveling direction of 3.0% and a tentering ratio of 2.0%. The woven fabric thus obtained was plain and had a weaving density for warp and weft directions of 54 yarns/inch. Properties of the raw yarn and woven fabric are shown in Table 4.

Comparative Example 2-7

Polyamide 66 resin was melt-extruded using a uniaxial extruder, the resulting resin was weighed using a gear pump, and the weighed resin was extruded into a nozzle (having a modification degree of 1.0) via a metal nonwoven filter (NF-07 manufactured by Nippon Seisen Co., Ltd.) to give a fibrous melt. Thereafter, the fibrous melt was directly passed through a heating cylinder immediately below the nozzle, cooled by cooling air, and then applied with a fatty acid ester-based spin finish oil. The fibrous melt thus applied was wound around a take-up roller, and drawn as is by a known method, so that a round cross-sectional polyamide 66 fiber having 350 dtex, 108 filaments, and a shrinkage in boiling water of 5.9% was obtained.

Using the fiber thus obtained as weft and warp, weaving was performed by a waterjet loom. After the weaving, the grey fabric was scoured, dried, and subjected to heat shrinkage treatment (heat setting) under the same conditions as in Example 2-6, to give a plain-woven fabric having a weaving density for warp and weft directions of 59 yarns/inch. Properties of the raw yarn and woven fabric are shown in Table 5.

When compared with the woven fabric of Example 2-6 made of the fibers in which the single yarn fiber had a substantially triangular cross-sectional shape, the woven fabric obtained in Comparative Example 2.7 had a higher high-pressure air permeability.

Comparative Example 2-8

According to the procedure in Comparative Example 2-1, a round cross-sectional polyamide 66 fiber having 350 dtex, 108 filaments, and a shrinkage in boiling water of 9.2% was produced.

Using the fiber thus obtained as weft and warp, weaving was performed by a waterjet loom. After the weaving, the grey fabric was scoured, dried, and subjected to heat shrinkage treatment (heat setting) under the same conditions as in Example 2-7, to give a plain-woven fabric having a weaving density for warp and weft directions of 59 yarns/inch. Properties of the raw yarn and woven fabric are shown in Table 5.

When compared with the woven fabric of Example 2-7 made of the fibers in which the single yarn fiber had a substantially triangular cross-sectional shape, the woven fabric obtained in Comparative Example 2-8 had a higher high-pressure air permeability.

Comparative Example 2-9

According to the procedure in Comparative Example 2-1, a round cross-sectional polyamide 66 fiber having 350 dtex, 108 filaments, and a shrinkage in boiling water of 9.2% was produced.

Using the fiber thus obtained as weft and warp, weaving was performed by a waterjet loom. After the weaving, the grey fabric was not subjected to any particular processing, and naturally dried as is to thereby finish a woven fabric. The woven fabric thus obtained was plain and had a weaving density for warp and weft directions of 57 yarns/inch. Properties of the raw yarn and woven fabric are shown in Table 5.

When compared with the woven fabric of Example 2-11 made of the fibers in which the single yarn fiber had a substantially triangular cross-sectional shape, the woven fabric obtained in Comparative Example 2.9 had a higher high-pressure air permeability.

Comparative Example 2-10

According to the procedure in Comparative Example 2-1, a round cross-sectional polyamide 66 fiber having 470 dtex, 72 filaments, and a shrinkage in boiling water of 5.8% was produced.

Using the fiber thus obtained as weft and warp, weaving was performed by a waterjet loom. After the weaving, the grey fabric was scoured, dried, and subjected to heat shrinkage treatment (heat setting) under the same conditions as in Example 2-12, to give a plain-woven fabric having a weaving density for warp and weft directions of 54 yarns/inch. Properties of the raw yarn and woven fabric are shown in Table 5.

It is considered that the fibers that constitute the woven fabric obtained in Comparative Example 2-10 had the same total fineness as that in Example 2-12, but the package ability of the woven fabric was decreased because the single yarn fiber had a rounded cross section, so that its movement in the fiber was less effective, and because the woven fabric was thick and rigid. Such woven fabric also had a high high-pressure air permeability.

Comparative Example 2-11

According to the procedure in Comparative Example 2-1, a round cross-sectional polyamide 66 fiber having 470 dtex, 72 filaments, and a shrinkage in boiling water of 9.3% was produced.

Using the fiber thus obtained as weft and warp, weaving was performed by a waterjet loom. After the weaving, the grey fabric was scoured, dried, and subjected to heat shrinkage treatment (heat setting) under the same conditions as in Example 2-13, to give a plain-woven fabric having a weaving density for warp and weft directions of 54 yarns/inch. Properties of the raw yarn and woven fabric are shown in Table 5.

It is considered that the fibers that constitute the woven fabric obtained in Comparative Example 2-11 had the same total fineness as that in Example 2-13, but the package ability of the woven fabric was decreased because the single yarn fiber had a rounded cross section, so that its movement in the fiber was less effective, and because the woven fabric was thick and rigid. The woven fabric obtained in Comparative Example 2-11 also had a high high-pressure air permeability.

TABLE 4

|  |  |  | Examples |  |  |  |  |  |  |  |
|---|---|---|---|---|---|---|---|---|---|---|
|  |  | Unit | 2-6 | 2-7 | 2-8 | 2-9 | 2-10 | 2-11 | 2-12 | 2-13 |
| Properties of raw yarn | Total fineness | dtex | 350 | 350 | 350 | 350 | 350 | 350 | 470 | 470 |
|  | No. of filaments | Filament(s) | 108 | 108 | 108 | 108 | 108 | 108 | 72 | 72 |
|  | Single yarn fineness | dtex | 3.2 | 3.2 | 3.2 | 3.2 | 3.2 | 3.2 | 6.5 | 6.5 |
|  | Modification degree of spinning nozzle | — | 6.0 | 6.0 | 4.0 | 8.0 | 10.0 | 6.0 | 6.0 | 6.0 |
|  | Strength | cN/dtex | 8.0 | 7.9 | 8.1 | 7.3 | 7.2 | 7.9 | 8.0 | 7.7 |
|  | Elongation | % | 16.1 | 17.3 | 17.9 | 15.6 | 15.3 | 17.3 | 18.1 | 19.5 |
|  | Shrinkage in boiling water | % | 5.5 | 9.6 | 9.8 | 9.5 | 9.2 | 9.6 | 6.2 | 9.3 |
|  | Cross-sectional shape | — | Triangular shape | Triangular shape | Triangular shape | Triangular shape | Triangular shape | Triangular shape | Triangular shape | Triangular shape |
|  | Modification degree | — | 1.53 | 1.55 | 1.4 | 1.8 | 2.1 | 1.55 | 1.59 | 1.65 |
|  | Regular triangular shape position | — | Inside | Inside | Inside | Inside | Inside | Inside | Inside | Inside |
|  | Degree of entanglement | No. of entanglement/m | 20 | 19 | 22 | 18 | 21 | 19 | 19 | 20 |
|  | Yarn widening ratio | — | 2.4 | 2.5 | 2.4 | 2.4 | 2.2 | 2.5 | 2.2 | 2.1 |

TABLE 4-continued

|  |  | Unit | Examples | | | | | | | |
|---|---|---|---|---|---|---|---|---|---|---|
|  |  |  | 2-6 | 2-7 | 2-8 | 2-9 | 2-10 | 2-11 | 2-12 | 2-13 |
| Properties of woven fabric | No. of stitches (warp/weft) | Filament(s)/2.5 cm | 59/59 | 59/59 | 59/59 | 59/59 | 59/59 | 57/57 | 54/54 | 54/54 |
|  | Cover factor | — | 2094 | 2094 | 2094 | 2094 | 2094 | 2023 | 2221 | 2221 |
|  | Thickness of base fabric | mm | 0.26 | 0.25 | 0.25 | 0.25 | 0.25 | 0.23 | 0.30 | 0.29 |
|  | ASTM stiffness (warp/weft) | N | 9/10 | 9/9 | 9/10 | 9/10 | 9/10 | 8/9 | 19/21 | 19/20 |
|  | ASTM package ability (warp/weft) | $cm^3$ | 1495 | 1470 | 1485 | 1475 | 1500 | 1400 | 2350 | 2320 |
|  | Tear strength (warp/weft) | N | 130/132 | 133/135 | 135/137 | 131/133 | 129/132 | 124/126 | 216/232 | 220/238 |
|  | High-pressure air permeability | $L/cm^2/min$ | 0.32 | 0.36 | 0.37 | 0.34 | 0.40 | 0.31 | 0.49 | 0.53 |
|  | High-pressure air permeability after folding | $L/cm^2/min$ | 0.34 | 0.39 | 0.41 | 0.36 | 0.45 | 0.33 | 0.52 | 0.55 |
|  | Ratio of change in air permeability | % | 106 | 108 | 111 | 106 | 113 | 106 | 106 | 104 |
|  | Yarn widening ratio of unwoven weaving yarn (warp) | — | 3.5 | 3.5 | 3.1 | 3.0 | 2.7 | 3.5 | 3.1 | 3.0 |
|  | Yarn widening ratio of unwoven weaving yarn (weft) | — | 3.5 | 3.5 | 3.1 | 3.0 | 2.7 | 3.5 | 3.1 | 3.0 |

TABLE 5

|  |  | Unit | Comparative Examples | | | | |
|---|---|---|---|---|---|---|---|
|  |  |  | 2-7 | 2-8 | 2-9 | 2-10 | 2-11 |
| Properties of raw yarn | Total fineness | dtex | 350 | 350 | 350 | 470 | 470 |
|  | No. of filaments | Filament(s) | 108 | 108 | 108 | 72 | 72 |
|  | Single yarn fineness | dtex | 3.2 | 3.2 | 3.2 | 6.5 | 6.5 |
|  | Modification degree of spinning nozzle | — | 1.0 | 1.0 | 1.0 | 1.0 | 1.0 |
|  | Strength | cN/dtex | 8.6 | 8.7 | 8.7 | 8.5 | 8.5 |
|  | Elongation | % | 19.5 | 20.4 | 20.4 | 20.8 | 22 |
|  | Shrinkage in boiling water | % | 5.9 | 9.2 | 9.2 | 5.8 | 9.3 |
|  | Cross-sectional shape | — | Round | Round | Round | Round | Round |
|  | Modification degree | — | 1 | 1 | 1 | 1 | 1 |
|  | Regular triangular shape position | — | — | — | — | — | — |
|  | Degree of entanglement | No. of entanglement/m | 18 | 20 | 20 | 21 | 20 |
|  | Yarn widening ratio | — | 1.6 | 1.7 | 1.6 | 1.5 | 1.5 |
| Properties of woven fabric | No. of stitches (warp/weft) | Filament(s)/2.5 cm | 59/59 | 59/59 | 57/57 | 54/54 | 54/54 |
|  | Cover factor | — | 2094 | 2094 | 2023 | 2221 | 2221 |
|  | Thickness of base fabric | mm | 0.28 | 0.27 | 0.25 | 0.34 | 0.33 |
|  | ASTM stiffness (warp/weft) | N | 11/11 | 10/11 | 11/12 | 25/26 | 24/25 |
|  | ASTM package ability (warp/weft) | $cm^3$ | 1610 | 1600 | 1510 | 2530 | 2510 |
|  | Tear strength (warp/weft) | N | 138/149 | 140/153 | 141/153 | 225/242 | 228/246 |
|  | High-pressure air permeability | $L/cm^2/min$ | 0.79 | 0.8 | 0.83 | 0.89 | 0.86 |
|  | High-pressure air permeability after folding | $L/cm^2/min$ | 0.83 | 0.85 | 0.86 | 0.95 | 0.9 |
|  | Ratio of change in air permeability | % | 105 | 106 | 104 | 107 | 105 |

TABLE 5-continued

|  | Unit | Comparative Examples | | | | |
| --- | --- | --- | --- | --- | --- | --- |
|  |  | 2-7 | 2-8 | 2-9 | 2-10 | 2-11 |
| Yarn widening ratio of unwoven weaving yarn (warp) | — | 2.2 | 2.3 | 2.3 | 2.1 | 2.1 |
| Yarn widening ratio of unwoven weaving yarn | — | 2.2 | 2.3 | 2.3 | 2.1 | 2.1 |

According to the present invention, it is possible to provide an airbag-use woven fabric and an airbag, having low air permeability, being flexible, and exhibiting good package ability without impairing mechanical strength of the woven fabric.

DESCRIPTION OF REFERENCE SIGNS

11 Circle circumscribing discharge opening provided in nozzle
12 Circle inscribing discharge opening provided in nozzle
13 Outer edge of discharge opening provided in nozzle
21, 21' Perpendicular bisector of straight line segment connecting apexes of shape appearing in cross section perpendicular to fiber axial direction of single yarn fiber
22, 22' Intersection point of perpendicular bisector with single yarn fiber cross section
31, 31' Circumscribed circle
32, 32' Inscribed circle
33, 33' Triangular shape formed by connecting apexes of shape appearing in cross section of single yarn fiber
34, 34' Outer periphery of single yarn fiber cross section
61 Measuring sample (fibers)
62 1 cm-diameter Teflon (registered trademark) rod
63 Load
64 Binding point
65 Measurement point of width (a) of fibers located at the uppermost portion of Teflon (registered trademark) rod when a constant tensile tension is applied
66 Measurement point of width (b) of fibers when a constant tensile tension is applied
67 Connecting yarn to load, using the same yarn as measuring sample

The invention claimed is:

1. An airbag-use woven fabric comprising a base fabric, wherein a yarn widening ratio of unwoven weaving yarn of fibers that constitute the base fabric is not less than 2.4 and not more than 3.5; and
wherein the fibers comprise single yarn filaments having a substantially triangular cross sectional shape and a modification degree of 1.4 to 2.2.

2. The airbag-use woven fabric according to claim 1, wherein the cross section of a single yarn filament includes a triangular shape formed by connecting points which contact a circumscribed circle of the cross section of the single yarn filament in the fibers that constitute a base fabric.

3. The airbag-use woven fabric according to claim 1, wherein the fibers are polyamide fibers.

4. The airbag-use woven fabric according to claim 1, wherein the fibers have a fineness of 100 dtex to 600 dtex.

5. The airbag-use woven fabric according to claim 1, wherein the airbag-use woven fabric has an air permeability under a pressure difference of 20 kPa of 0.1 L/cm$^2$/min to 0.7 L/cm$^2$/min.

6. The airbag-use woven fabric according to claim 1, wherein the folded airbag-use woven fabric has an air permeability under a pressure difference of 20 kPa of 0.1 L/cm$^2$/min to 0.7 L/cm$^2$/min.

7. An airbag comprising the woven fabric defined in claim 1.

8. The airbag-use woven fabric according to claim 1, wherein the fibers have a cover factor of not more than 2300.

9. An airbag-use woven fabric,
comprising single yarn fibers having a substantially triangular cross sectional shape and a modification degree of 1.3 to 2.2;
having a tear strength of not less than 120 N; and
having an air permeability under a pressure difference of 20 kPa of not more than 0.65 L/cm$^2$/min.

10. The airbag-use woven fabric according to claim 9, wherein the folded airbag-use woven fabric has an air permeability under a pressure difference of 20 kPa of not more than 0.65 L/cm$^2$/min.

11. The airbag-use woven fabric according to claim 9, wherein a rate of change in the air permeability of the folded woven fabric under a pressure difference of 20 kPa, with respect to the air permeability of the woven fabric under a pressure difference of 20 kPa is not more than 150%.

12. The airbag-use woven fabric according to claim 9, having a package ability specified in accordance with ASTM D6478 of 1200 cm$^3$ to 2400 cm$^3$ and a stiffness specified in accordance with ASTM D4032 of 5 N to 22 N in both warp and weft directions.

13. The airbag-use woven fabric according to claim 9, wherein the fibers that constitute the woven fabric have a total fineness of 200 dtex to 500 dtex and a cover factor of not more than 2300.

14. The airbag-use woven fabric according to claim 9, wherein lines connecting apexes of a substantially triangular shape that appears in the cross section of the single yarn fiber are located inside the outer periphery of the single yarn fiber cross section.

15. A method of manufacturing the airbag-use woven fabric defined in claim 9, comprising the steps of:
weaving multifilaments; and
naturally drying the woven grey fabric or heat-treating the woven grey fabric at 20° C. to 190° C.

16. A method of manufacturing the airbag-use woven fabric defined in claim 9, comprising the steps of:
weaving multifilaments;
scouring the woven grey fabric with water of 50° C. to 100° C.; and
heat-treating the scoured grey fabric at 100° C. to 150° C.

17. A method of manufacturing the airbag-use woven fabric defined in claim 9, comprising:
- weaving multifilaments;
- scouring the woven grey fabric with water of 30° C. to 90° C.; and
- heat-treating the scoured grey fabric at 110° C. to 190° C. under an overfeeding percentage in a traveling direction of the grey fabric of 1.5% to 6.0% and an overfeeding percentage in a direction perpendicular to the traveling direction of 1.0% to 4.0% relative to the length in the direction perpendicular thereto.

* * * * *